(12) United States Patent
Moorthi et al.

(10) Patent No.: US 10,484,473 B2
(45) Date of Patent: Nov. 19, 2019

(54) SYSTEMS AND METHODS FOR EFFICIENT DISTRIBUTION OF STORED DATA OBJECTS

(71) Applicant: Solano Labs, Inc., San Francisco, CA (US)

(72) Inventors: Jay Moorthi, San Francisco, CA (US); William Josephson, Greenwich, CT (US); Steven R. Willis, Cambridge, MA (US); Thomas E. Westberg, Stow, MA (US); Christopher A. Thorpe, Lincoln, MA (US)

(73) Assignee: Solano Labs, Inc., San Francisco, CA (US)

( * ) Notice: Subject to any disclaimer, the term of this patent is extended or adjusted under 35 U.S.C. 154(b) by 196 days.

(21) Appl. No.: 15/636,490

(22) Filed: Jun. 28, 2017

(65) Prior Publication Data

US 2017/0374151 A1  Dec. 28, 2017

Related U.S. Application Data

(60) Provisional application No. 62/452,248, filed on Jan. 30, 2017, provisional application No. 62/355,590, filed on Jun. 28, 2016.

(51) Int. Cl.
*H04L 29/08* (2006.01)
*H04L 29/06* (2006.01)

(52) U.S. Cl.
CPC ...... *H04L 67/1097* (2013.01); *H04L 67/2847* (2013.01); *H04L 67/42* (2013.01)

(58) Field of Classification Search
CPC .. H04L 67/42; H04L 67/1097; H04L 67/2847
See application file for complete search history.

(56) References Cited

U.S. PATENT DOCUMENTS 6,085,193 A     7/2000  Malkin et al.
6,959,320 B2 *  10/2005  Shah .................. G06F 8/65
                                              709/203

(Continued)

OTHER PUBLICATIONS

PCT/US2017/039686, dated Sep. 14, 2017, International Search Report and Written Opinion.

(Continued)

*Primary Examiner* — John M Macilwinen
(74) *Attorney, Agent, or Firm* — Fitch Even Tabin & Flannery LLP

(57) ABSTRACT

A distributed data storage system is provided for offering shared data to one or more clients. In various embodiments, client systems operate on shared data while having a unique writeable copy of the shared data. According to one embodiment, the data storage system can be optimized for various use cases (e.g., read-mostly where writes to shared data are rare or infrequent (although writes to private data may be frequent. Some implementations of the storage system are configured to provide fault tolerance and scalability for the shared storage. For example, read-only data can be stored in (relatively) high latency, low cost, reliable storage (e.g. cloud), with multiple layers of cache supporting faster retrieval. In addition, some implementations of the data storage system offer a low-latency approach to data caching. Other embodiments improve efficiency with access modeling and conditional execution cache hints that can be distributed across the data storage system.

23 Claims, 13 Drawing Sheets

(56) References Cited

U.S. PATENT DOCUMENTS

| | | | |
|---|---|---|---|
| 9,613,158 B1 | 4/2017 | Lepeska | |
| 2007/0192444 A1 | 8/2007 | Ackaouy et al. | |
| 2012/0266161 A1* | 10/2012 | Baron | G06F 9/45558 |
| | | | 718/1 |
| 2013/0054803 A1 | 2/2013 | Shepard et al. | |
| 2014/0108351 A1 | 4/2014 | Nallathambi et al. | |
| 2014/0201314 A1 | 7/2014 | Borkenhagen | |
| 2015/0356081 A1* | 12/2015 | Cronin | H04N 1/2125 |
| | | | 348/231.3 |
| 2017/0316210 A1* | 11/2017 | Patil | G06F 21/577 |

OTHER PUBLICATIONS

International Search Report and Written Opinion dated Sep. 14, 2017 in connection with International Application No. PCT/US2017/039686.

* cited by examiner

SYSTEMS AND METHODS FOR EFFICIENT DISTRIBUTION OF STORED DATA OBJECTS

RELATED APPLICATIONS

This Application claims priority under 35 U.S.C. § 119(e) to U.S. Provisional Application Ser. No. 62/452,248, entitled "SYSTEMS AND METHODS FOR EFFICIENT DISTRIBUTION OF STORED DATA OBJECTS" filed on Jan. 30, 2017, which is herein incorporated by reference in its entirety. This Application claims priority under 35 U.S.C. § 119(e) to U.S. Provisional Application Ser. No. 62/355,590, entitled "SYSTEM AND METHOD OF OPTIMIZING TEST EXECUTION" filed on Jun. 28, 2016, which is herein incorporated by reference in its entirety.

BACKGROUND

Increasing usage of cloud computing has provided increasing compute capacity for addressing compute intensive tasks. In some conventional approaches, the ready availability of scalable cloud services has led to overuse of such resources. In some examples, the increased utilization of resources also results in a performance at cost problem, and for some architectures an upper scale limit beyond which additional resources are limited by the capability to distribute data across the resources on which compute tasks are to be executed.

SUMMARY

It is realized that fundamental to scaling architectures to handle compute intensive tasks, is the need to efficiently distribute the data and the tasks themselves to the compute resources that are to execute the tasks. Accordingly, a distributed data storage system is provided that manages some of the issues and problems with convention implementations. Various aspects provide for a distributed data storage system offering shared data to one or more clients. In various embodiments, client systems operate on shared data while having a unique writeable copy of the shared data. According to one embodiment, the data storage system can be optimized for various use cases (e.g., read-mostly use case, where clients' writes to the shared data are rare or infrequent (although writes to the client's private data may be frequent or in some alternatives, performed on a separate, independent storage system)). Some implementations of the storage system are configured to provide fault tolerance and scalability for the shared storage. For example, read-only data can be stored in (relatively) high latency, low cost, reliable storage (e.g. cloud based storage, (e.g., even supported by SSD)), with multiple layers of cache supporting faster retrieval. In addition, some implementations of the data storage system offer a low-latency approach to data caching. Various embodiments of the distributed data storage system are described with reference to a BX system (the name derived from "Block eXchanger"). The BX system embodiments provide details of some operations and functions of the data storage system that can be used independently, in conjunction with other embodiments, and/or in various combination of functions, features, and optimizations discussed below.

According to another aspect, a BX proxy has a cache for blocks requested from a server. Various embodiments of the BX proxy cache are configured to improve data access performance in several ways. The proxy can, within its local system, provide an image into the remote server to several local filesystem clients each with its own Copy on Write layer. An entity creating proxy cache hints can send those cache hints to pre-fetch blocks of data from the server. Because storage servers introduce latency through network request/response time, and server disk access time, reducing this on average can be a significant advantage over various conventional approaches.

According to another aspect various embodiments are directed to improving utilization and efficiency of conventional computer system based on improving integration of network-attached storage. In some examples, improvements in network-attached storage are provided via embodiments of the "BX" system. In some embodiments, network attached storage can be used to provide advantages in flexibility and administration over local disks. In cloud computing systems network-attached storage provides a persistent storage medium that can be increased on demand and even moved to new locations on the fly. Such a storage medium may be accessed at a block level or at the file layer of abstraction, for examples as part of layered storage architecture.

According to one aspect, a distributed data storage system is provided. The distributed data system comprises: a storage unit configured to host common data, a first server, configured to access the storage unit and access at least a portion of the common data, a proxy unit, configured to grant a client access to the storage unit through the first server and manage the common data as a layered architecture including at least a first write layer, a second server, configured to coordinate authentication of a client device, wherein the storage unit is located external to the client device and wherein the proxy unit is further configured to: execute remote requests on the common data and any write layer data, and present the execution of the remote request to the client device as a local execution.

According to one embodiment, the proxy unit includes at least an executable component configured to execute on a client device. According to one embodiment, the proxy unit is further configured to manage a local cache for pre-fetching data responsive to cache hints. According to one embodiment, the proxy unit is configured to retrieve and store data from the first server or the storage unit in the local cache responsive to data access patterns for respective client devices. According to one embodiment, the first server is configured to: manage a data architecture including at least a portion of common data and a copy on write layer, and store any data written by the client within the copy on write layer and associated with a respective client.

According to one embodiment, the proxy unit is configured to: interact with the copy on write layer and request data from the copy on write layer for respective clients. According to one embodiment, the proxy unit is configured to: host at least a portion of data managed in a copy on write layer, and store any data written by a respective client associated with at least the portion within the copy on write layer. According to one embodiment, the second server is configured to access the copy on write layer of the first server. According to one embodiment, at least one of the first server and the second server is configured to access the copy on write layer of the proxy unit.

According to one embodiment, the common data is configured to be available only in read-only form and the first server is configured to access the storage unit without checking a status of the common data. According to one embodiment, the proxy unit is configured to load the data read from the first server or the storage unit into the cache based on at least one predicted request. According to one aspect, a computer implemented method for managing a distributed data storage is provided. The method comprises: obtaining, by at least one processor, a remote request from a client device, the remote request requesting access to common data hosted on a storage unit, connecting to a proxy unit configured to provide access to at least a portion of the common data, managing, by the proxy unit, access to the common data as a layered architecture including at least a first write layer, executing remote requests on the common data and any write layer data, and presenting the execution of the remote request to the client device as a local execution. According to one embodiment, the method further comprises authenticating the client device through a server.

According to one embodiment, the storage unit is located external to the client device method further comprises executing an executable component on the proxy device. According to one embodiment, the write layer is configured to store any data written to the storage unit by the client device. According to one embodiment, the method further comprises: managing a data architecture including at least a portion of common data and a copy on write layer, and storing any data written by the client within the copy on write layer and associated with a respective client. According to one embodiment, a first server is configured to access the first write layer of the proxy unit.

According to one embodiment, the common data is configured to be available only in read-only form and a first server is configured to access the storage unit without checking a status of the common data. According to one embodiment, the method further comprises on a cache of the proxy unit, pre-fetching data from the storage unit in response to a cache hint. According to one embodiment, the method further comprises: hosting at least a portion of data managed in a copy on write layer, and storing any data written by a respective client associated with at least the portion within the copy on write layer. According to one embodiment, the method further comprises accessing a predicted request and accessing at least a portion of the common data based on the predicted request.

According to one aspect, a distributed data storage system is provided. The distributed data storage comprises: a proxy component configured to manage a connection between a client device and a storage unit containing at least common data, a modeling component configured to: track historic access data of accesses of the common data, and generate one or more profiles corresponding to the historic access data, wherein the one or more profiles are associated with a cache execution hint, wherein the proxy layer is further configured to: match a request from the client device to a profile of the one or more profiles, and trigger caching of data specified by the profile.

According to one embodiment, the cache execution hint specifies a data access pattern, and data to pre-fetch responsive to the data access pattern. According to one embodiment, the storage server comprises the proxy component and the modeling component and the storage server is configured to access the common data on the storage unit. According to one embodiment, the modeling component is configured to generate a cache execution hint including data to pre-fetch responsive to a pattern. According to one embodiment, the modeling component is further configured to generate data eviction parameters for the pre-fetched data responsive to modeling historic access data. According to one embodiment, the modeling component is further configured to monitor a caching performance parameter.

According to one embodiment, monitoring the caching performance parameter further comprises comparing the caching performance parameter to a threshold value and increasing a size of a cache if the caching performance parameter falls below the threshold value. According to one embodiment, monitoring the caching performance parameter further comprises comparing the caching performance parameter to a threshold value and ignoring the cache execution hint if the caching performance parameter falls below the threshold value.

According to one aspect, a computer implemented method for managing distributed data is provided. The method comprises: tracking, by at least one processor, historic access data of access of common data, generating, by the at least one processor, one or more profiles corresponding to the historic access data, wherein generating includes associating the one or more profiles with a cache execution hint, analyzing, by the at least one processor, a request from a client device to access at least a portion of the common data, matching, by the at least one processor, the request from the client device to a profile of the one or more profiles, and triggering, by the at least one processor, caching of data specified by the profile According to one embodiment, generating one or more profiles further comprises generating a first profile and a second profile, wherein the second profile branches from the first profile. According to one embodiment, the method further comprises retrieving data from a process table of the client device. According to one embodiment, matching the request further comprises selecting a profile of the one or more profiles based at least in part on the retrieved data from the process table and the request. According to one embodiment, the method further comprises tracking a caching performance and increasing a size of a cache if the caching performance falls below a threshold value.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," " this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
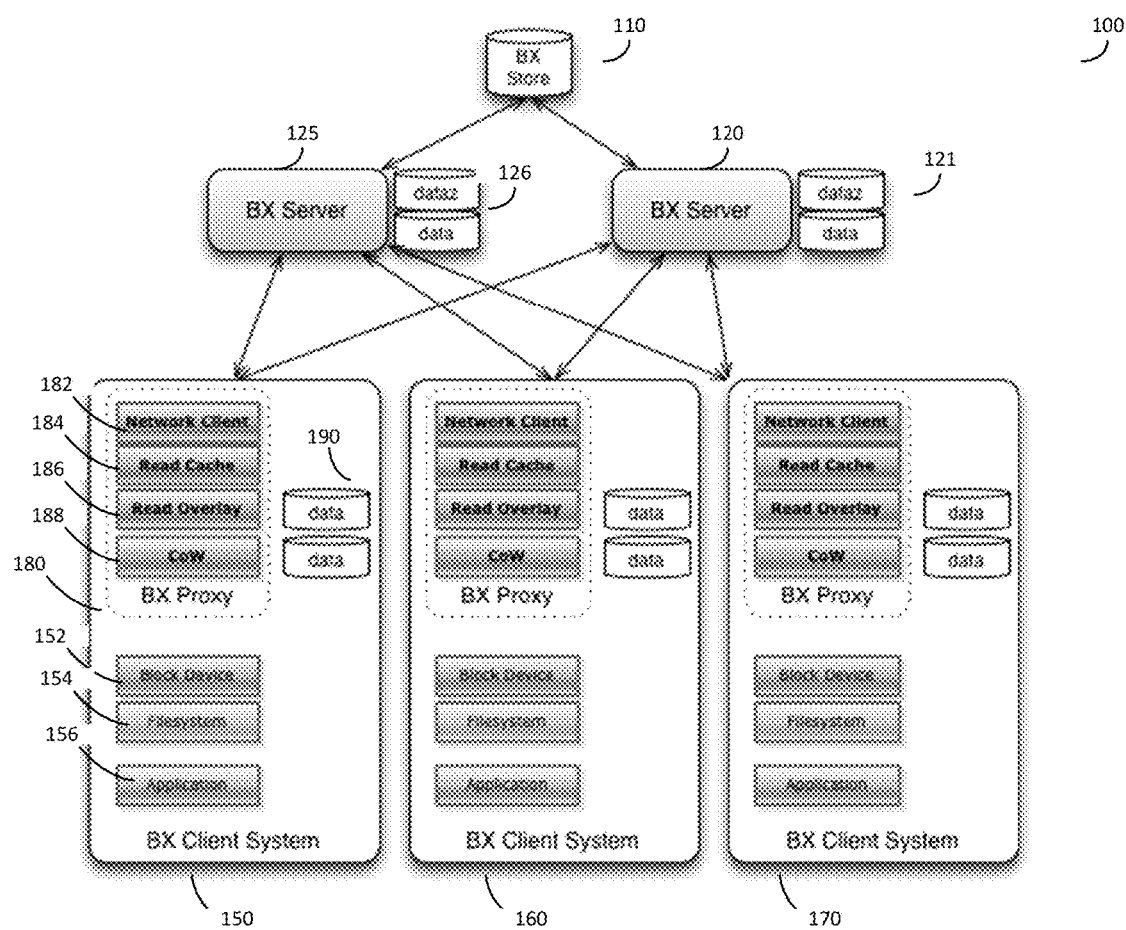
FIG. 1 illustrates an exemplary distributed data storage system, in accordance with some embodiments.

Stated broadly, various aspects of the disclosure describe shared data architectures with respective clients having unique writable copies of the shared data In various embodiments, client systems operate on shared data while having a unique writeable copy of the shared data. In some embodiments, the data storage system can be optimized for the read-mostly use case, where clients' writes to the shared data are rare or infrequent (although writes to the client's private data may be frequent), or in some embodiments, performed on a separate, independent storage system. Some implementations of the storage system are configured to provide fault tolerance and scalability for the shared storage.

According to another aspect, a BX proxy has a cache for blocks requested from a server. According to some embodiments, the BX proxy cache can be configured to emulated RAM caching done by the filesystem layer, and provide performance improvements in several ways. The proxy can, within its local system, provide an image into the remote server to several local filesystem clients each with its own Copy on Write layer. An entity creating proxy cache hints can send those cache hints to pre-fetch blocks of data from the server. In one embodiment, a BX server can recognize that a file has been opened for reading and do an early read of some or all of file's contents into its local cache in anticipation that opening the file means that the data will likely be needed soon by the client. In another embodiment, a BX proxy could request this same data from the BX server once a file is opened, causing the BX server to fetch the applicable segments from the BX store. Because storage servers introduce latency through network request/response time, and server disk access time, reducing this on average can be a significant advantage. The cache hinting system can generate cache eviction hints, detect changed access patterns, and even reorder the filesystem that the BX is serving as an image.

Various embodiments described herein relate to a distributed data storage system comprising a storage unit configured to host common data, a first server, configured to access the storage unit and access at least a portion of the common data, a proxy unit, configured to grant a client access to the storage unit through the first server and manage the common data as a layered architecture including at least a first write layer, and a second server, configured to coordinate authentication of a client device. The storage unit can be located externally to the client device. The proxy unit can be further configured to execute remote requests on the common data and any write layer data, and present the execution of the remote request to the client device as a local execution. The distributed data storage system can enable multiple client devices to access the common data through the proxy units, while maintaining the modifications as write layer data, which in turn reduces the need for data storage and redundant repositories found in conventional data storage systems. Conventional data storage systems require maintenance of updated records for all the clients that request the data, leading to a large increase in data storage and redundancy in the storage systems.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to various embodiments, the block exchanger (BX) architecture is comprised of several distinct components, each of which corresponds to a layer of storage. FIG. 1 shows a distributed storage system 100 which can comprise one or more storage units 110, one or more servers 120, and one or more client devices 150. As an example, FIG. 1 shows a distributed storage system 100 with a single storage unit 110, a first server 120, a second server 125, a first client device 150, a second client device 160, and a third client device 170, but it should be appreciated that any number of storage units, servers, and client devices is possible. In some embodiments, the storage unit 110 includes a highly reliable, network-accessible storage system that is the most authoritative but often most distant from the clients 150, 160, and 170. In some embodiments, the storage unit 110 can be implemented by a cloud storage service like Amazon Web Services' S3. The servers 120 and 125 can be configured to intermediate requests from the clients 150, 160, and 170 to the storage unit 110. The clients 150, 160, and 170 may comprise client devices using data from the storage unit 110. The client device 150 can include a proxy 180, which may enable a client to view the storage unit 110 as a native device rather than employ custom software to interact with the storage unit 110. According to various embodiments, storage unit 110 is configured as the authoritative source of all images and can be optimized to store image data with low cost, high reliability, and high availability. The servers 120 and 125 can be optimized to deliver higher performance to the client devices 150, 160, and 170 than a direct connection from the client devices 150, 160, and 170 to the storage unit 110 would be.

The client devices 150, 160, and 170 can be any system reading from the storage unit 110 or the servers 120 and 125. Some embodiments may support one or more client devices. In one embodiment, the client 150 connects to an storage unit 110, such as a database, in which objects or records can be stored, and the objects or records can be transmitted to the client device 150 via the server 120 or the server 125 and/or the proxy 180.

The client device 150 can be one of several supported connectors to the servers 120 and/or 125. In some embodiment, the client device 150 can be a Network Block Device (NBD) client that may attach to (a) a proxy process 180 running locally on the same client device 150 (a "proxy" embodiment), (b) a specialized coprocessor or similar device exposing a network interface to the same client device 150, or (c) on another device connected to the client device 150, to which the client connects via a high-speed network interface. In another embodiment, a local hardware "bridge" on the client device 150 can be configured to expose a block storage device to the client, while connecting to the storage unit 110 over the bridge's network interface (the "bridge" embodiment). In some embodiments, the client device 150 can be configured to connect or interact with a simple block device (e.g., of some kind), whether the block storage device appears networked, local, or virtual; the system 100 can be configured to manage the input/output (I/O) from the block device seen by the client device 150 to the servers 120 and 125.

Various embodiments of the system 100 can include a proxy 180, with a relationship to the client device 150 as described above. The proxy 180 can include a Copy-on-Write (CoW) layer 188 that is not directly seen by the client device 150. According to one embodiment, written data ("writes") that would be communicated to the client device 150 are intercepted in the CoW layer 188, and stored on separate storage 190 from the primary, read-only data. In some embodiments the separate storage 190 can be maintained by the proxy 180 and stored locally on the client device 150. The proxy 180 can then verify that subsequent reads to any blocks written to in this way return the updated data, not the original read-only data. For example, in some embodiments the proxy 180 can be configured to check local storage 190 or metadata associated with local storage 190 to check if updated data is available.

In some embodiments, the proxy 180 can also implement a local block cache 184, and attach to a server 120 or 125. Since writes can be intercepted locally by the CoW layer 188, the connection to the server 120 or 125 can be configured as Read-Only (and in some examples always read-only). According to some embodiment, the configuration enables any server (e.g., 120 or 125) to offer its storage to many clients 150, 160, and/or 170, while needing fewer resources for updating its data, for example, due to any clients 150, 160, and/or 170 writing back to one of its blocks (or objects). According to one embodiment, this architecture and configuration enables a proxy 180 to connect to many servers, such as servers 120 and 125, for identical data. In one example, enabling the proxy 180 to connect to many servers offers performance and reliability advantages—the scalability of some implementations provides more resources and greater efficiency than convention approaches. As an example, there can be one server and one or more clients connected to it, but in other embodiments a larger deployment is configured support multiple servers and multiple proxies, improving scalability and fault tolerance.

According to one embodiment, the server 120 or 125 can serve one or more "images." An image may represent a collection of sequential data objects, which may be referred to generically as "blocks." In some embodiments, an image can include a sequence of blocks, as may be found on a block storage device such as a disk drive or disk partition. For example, a "block" can be referred to as a physical record, and is a sequence of bytes or bits, usually containing some whole number of records, having a maximum length, a "block size." In one example, the blocks for a particular image are stored on a server 120 or 125. In some embodiments, an image can also include storage blocks and may also include references to storage blocks of other images.

According to various embodiments, each server 120 and 125 serving an image can be configured to present the same image to all clients 150, 160, and 170, for example, in read-only form. Images can be created and maintained by an administrator. The administrator may establish an exclusive, read-write connection to the storage unit 110, and may create or update an image in the storage unit 110 for all clients 150, 160, and/or 170 simultaneously. In some embodiments, the administrator can be a person using the system. As an example, the image can include a system upgrade or addition of a new data set and index to a database. In some embodiments, "exclusive" is a system configuration that when executed prevents other clients from accessing the data store while, for example, an upgrade or addition is operation is ongoing.

When the proxy 180 establishes a new connection with a server 120 or 125, the proxy 180 can specify an identifier of the image it wishes to use. In one embodiment, if that server 120 or 125 does not have the specified image available, the server is configured to search a database of images, or other known servers, to pull the specified image from the storage unit 110 as needed. If no image can be found with that identifier, the server 120 or 125 can return an error.

In various embodiments, the servers 120 and 125 may have local storages 121 and 126 respectively, with which the servers can use to cache blocks needed by the clients 150, 160, and/or 170. In some embodiments, the local storages 121 and 126 can be partitioned into multiple types, which can be configured to include "fast" (lowest latency, highest number of I/O operations per second—IOPS), "small" (compressed data segments that permit storing more data with lower performance due to the cost of decompressing the data), "encrypted", or other types. In one embodiment, the server 120 or 125 can request compressed data from the storage unit 110, decompresses the data and stores it on its local storage 121 or 126, and sends the decompressed data to the proxy 180. Subsequent accesses to the same data can be routed to the decompressed, local cache within the local storage 121 or 126. This can reduce client compute demand (for decompression) at the cost of network bandwidth, and can reduce latency by making recently used data immediately accessible from the server 120 or 125 instead of the more distant storage unit 110—either option can represent execution improvement over some conventional approaches.

Caches can be inherently nonlinear; as caches are commonly designed to leverage locality of references, keeping important accesses in local fast storage. A BX server cache for a particular application can be configured to respond to wildly different request patterns, for example, the second time the application is run, not because the BX data accesses are different, but in some cases the BX cache can see very few accesses at all. For example, one test can have about 10,000 accesses the first run, and a few dozen during the second run. This can be because there is also an operating-system controlled file system cache between the BX (cached) client driver and the application itself. For example, in some embodiments, the BX proxy 180 may not know when the operating system returned data from an internal cache without requesting it from the BX proxy 180, though in some embodiments (for example an implementation on Solaris running ZFS) may permit a greater level of transparency with respect to the OS cache of a filesystem: the BX proxy 180 could still be able to discover when particular data was requested and returned from the OS cache, even if the data was not requested from the proxy 180. That transparency could be used in other embodiments to provide cache hint data to the BX system, even if the relevant data were cached and provided by the operating system.

In some embodiments, clients 150, 16, and 170, do not directly create, update, or delete images. Instead, an administrator (not shown) can connect directly to the storage unit 110 and create an image. Administrators can also perform operations such as: cloning images, apply Readoverlays to cloned images, or deleting images.

If an image is deleted, any other cloned or overlaid images referring to its segments may not be deleted, and the segments referred to by other images can be maintained until no image refers to those segments. This can be implemented with a simple reference count or garbage collection mechanism.

In some embodiments, the original disk image to be served may originate in a server outside the location hosting the storage unit 110 or servers 120 or 125. To facilitate this, the administrator can use an upload tool to directly create an image in the storage unit 110 from a local device. The upload can be done as a block copy, using for example the Unix "dd" command. In one embodiment, this feature can read blocks into a buffer for a segment, compress the segment, and store the segment in the storage unit 110. Because this can be a relatively slow process (for example, if the image is many terabytes and the network link does not accommodate that) the upload can be interruptible. The upload tool can be configured to keep track of which segments it had successfully uploaded and on restart uploads the remainder. In addition, the upload tool can be statically or dynamically throttled to keep from saturating the local network link.

Various embodiments can incorporate one or more the system elements described above with respect to FIG. 1, and can include any combination of the data storage system architecture elements. According to some implementations the architecture elements include a BX store configure to provide a reliable, low cost, high latency network storage system (for example, a BX storage system can be implemented on an AWS S3, as a cloud data warehouse, or as a file server in a private data center, among other options); a BX server configured to provide network interfaces for connectivity to BX store(s) and to BX client(s) (for example, including any associated proxies). According to one embodiment, a BX server translates client read requests into accesses to the BX store. In another embodiment, a BX server can be configured with local storage to cache BX data. Further, the BX server can be configured to decompress data stored on the BX Store and transmit from the BX Store in compressed form or decompress from the BX Store as part of transmission.

Because each BX network client 150 can connect to many BX servers 120 or 125 offering identical read-only images, the system can benefit from load balancing to the least loaded server. In one embodiment, the client 150 can choose the least loaded server. In another, if any given read transaction is too slow, an identical read request can be made to another BX server, and the first received response is used, evening out the load among servers. In still another implementation, a system with excess bandwidth may have the client 150 make two or more identical read requests to different servers 120 or 125, and use the first response that comes back. In some implementations, a BX proxy 180 also has a local read cache 184 with a Cache Hinting system to lower latency in many cases, as discussed in greater detail herein.

In one embodiment, if a read request from a server 120 or 125 is relatively slow, or if the server 120 or 125 is unavailable, future and/or retried read requests can be routed to other servers 120 or 125 in the pool, providing fault tolerance. This embodiment can prevents a central BX server 120 or 125 from being a single point of failure.

In one embodiment, a separate system monitors load on the BX system and adds or deletes BX servers 120 or 125 to or from the pool based on client demand. In another embodiment, a similar process can be applied to the BX storage unit 110, where high load or latency to the BX storage unit 110 may lead to duplication of the BX storage unit 110. The BX storage unit 110 can be duplicated within a data center or geographic area for redundancy or load balancing, or across regions to reduce latency.

If a BX proxy loses its network connection to its server, it may use other available connections, but also periodically retry connections back to the original server. This allows server upgrades to proceed in a rolling manner, which minimizes impact on clients.

In one embodiment, the BX server 120 or 125 keeps basic information (for example, image length, applicable compression or encryption algorithms, cache hint data, etc.) about an image named, for example, "myImage" in one or more files and the data for the image in a series of one or more segment data files. In one example, the basic information can be stored in "myImage.img", uncompressed data can be stored in "myImage.data.N", compressed data can be stored in "myImage.dataz.N", encrypted data can be stored in "myImage.datax.N", and compressed and encrypted data can be stored in "myImage.datazx.N". The N refers to the N-th segment file of the image. In some embodiments, each segment size can be identical, except for the last segment, and an offset into the image data of N×segmentSize would be stored at the beginning of the data file with sequence number N. For example, with a 16 MB segment size, a 32 GB image would be comprised of 2048 segments numbered 0 to 2047, and an 34 MB offset into the image would begin 2 MB into the data file with sequence number 2. It should be appreciated that the image file names and sizes are given simply as an example, and should not be considered limiting.

According to one embodiment, a sequence may include either or both compressed or uncompressed data for any sequence number. Compressed and/or encrypted image data may include header information specifying the applied compression or encryption algorithms.

In one embodiment, the .dataz file is a compressed form of the N-th segment file compressed. As discussed above, BX data is stored in one or more locations in a hierarchy of caches, and even on the BX server, the disk image is stored in lower-latency .data files (on higher performance local storage) and slightly higher-latency .dataz files (which is decompressed to .data files when needed, potentially deleting an older .data file for a different segment to make room). Once the BX server's local capacity is exhausted, even local .dataz files can be deleted, knowing that the .dataz files are also stored in the BX store.

Some embodiments also include a BX proxy configured to provide a hardware "bridge" or software "bridge" residing on a BX client. According to some embodiments, the BX proxy is configured to expose the BX system to the client as a standard storage or network device. In one example, the BX client interacts with the BX system as a standard storage device (e.g., issuing commands, write, reads, etc. to the standard storage device as if it were a hard disk on any computer). The BX proxy provides a transparent interface to the BX client obscuring the interactions between the BX sever and the BX store from the client's perspective, so that the BX client accepts responses to standard commands on the standard storage device. In further examples, a BX proxy may also implement additional features such as caching BX data or storing local writes to BX data. Some embodiments, also include a BX API server or a central server (or, for high availability, two or more servers) that can be configured to: coordinate(s) client authentication and authorization; automatic scaling; deduplication of image data; and replication and dissemination of BX system configuration (e.g. through configuration profiles, discovery). A configuration profile can be obtained by the client, giving the client a static view of the BX system; this configuration can be periodically updated by BX proxy software polling the BX server for the current configuration. A discovery protocol (such as SLP, used by the SMI-S Storage Management Initiative—Specification) can be used to automatically allow BX proxies to discover and use available BX servers, and/or BX servers to discover and use available BX stores, including any changes to the BX system topology from time to time. According to some implementations, for example in systems without a BX API server, administrative personnel handle some of the BX system tasks, For example, administrative personnel can be responsible for ensuring correct client configuration in embodiments, where a BX API server is not configured or present.

Figure 2:
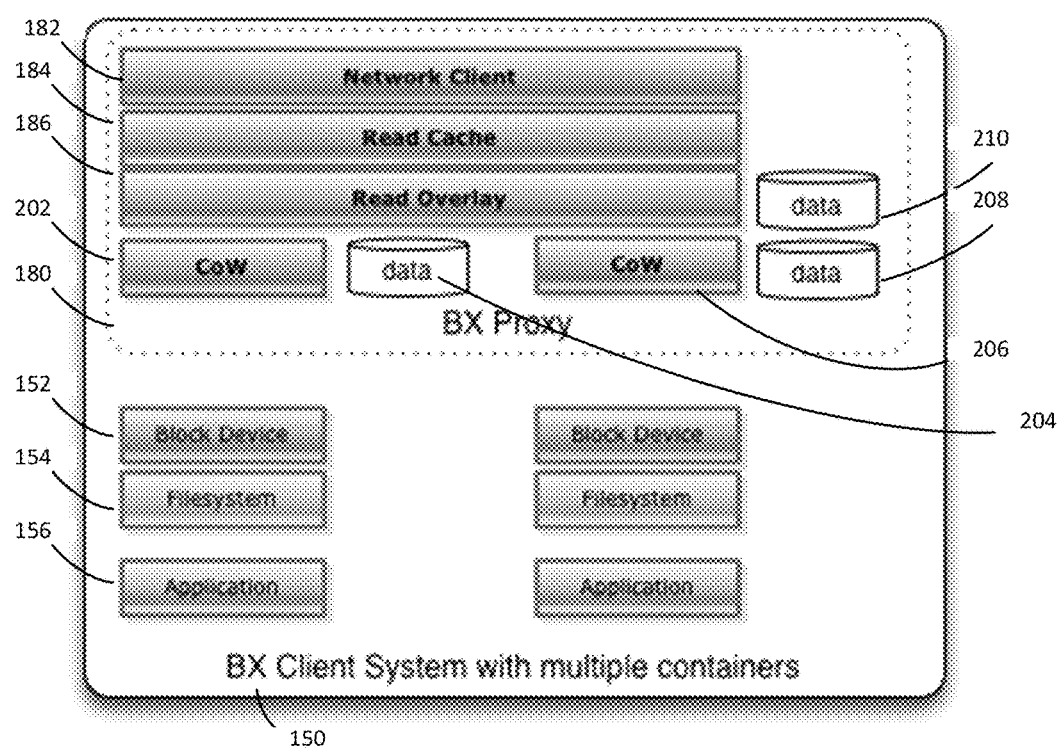
FIG. 2 illustrates an exemplary client device containing a proxy unit, in accordance with some embodiments.

FIG. 2 shows an example of a client system 150, containing a proxy 180. The client system 150 can include a block device 152, a filesystem 154, and an application 156. The proxy 180 can include a network client 182, a read cache 184, and a read overlay 186. The network client 182 can connect to any of the servers 120 and 125. The read cache 184 can be used by the proxy 180 to generate cache hints to lower latency. The read cache 184 can be RAM, or any other suitable type of memory.

Referring back to FIG. 1, in some embodiments, the system 100 can operate at the block, or "sequential data" level of abstraction. In embodiments where storage unit 110 is used to act as a "block device" for a computing system, it can operate at the "disk drive" level of abstraction, rather than at the file level (or higher). Because the filesystem layer can place portions of files anywhere on its disk, it can be difficult to infer future access patterns without the higher level filesystem information. In one embodiment, a server 120 or 125 can be configured to use the fact that a file has been opened for reading and do an early read of some or all of file's contents into its local cache 121 or 126 in anticipation that opening the file means that the data will likely be needed soon by the client 150, 160, or 170. In another embodiment, a proxy 180 could request this same data from the server 120 or 125 once a file is opened, causing the server 120 or 125 to fetch the applicable segments from the storage unit 110. Because storage servers can introduce latency in two ways, through network request and response time, and server disk access time, reducing this on average can be a significant advantage.

Similar improvements can be accomplished at the block level by looking for access patterns. The storage unit 110 can be read-only in various embodiments; a file or object does not move from one location to another. The CoW 188 can hide changes to a file from a server 120 or 125 based on writes. If, for example, a large file which is usually consumed whole and linearly, occupies a contiguous sequence of blocks (or even non-contiguous; just repeatable) in the storage unit 110, the server 120 or 125 may know that when a first block is read, for example block 783, there is a very high probability block 787 will be requested next, followed by 842 and so on. In this case, the server 120 or 125, upon obtaining a read request for block 783, can include a Cache Hint along with this frequently seen pattern, which tells the proxy 180 that it should pre-fetch the others in the list (787 and 842) even though the filesystem 154 may have not yet made that request. The proxy 180 can launch one or more of those read requests, filling its cache 184 in anticipation of the potential read requests to come. If the client application 156 soon requests those blocks, the system is configured to have those files quickly accessible from the proxy's 180 read cache 184 or the local cache 121 or 126 of the servers 120 or 125 respectively, instead of waiting for the potentially longer round request to the storage unit 110 through a server 120 or 125.

In another embodiment, the proxy's 180 speculative requests can be sent to an alternate server 125 in the background. In the event the next request of the filesystem 154 is not the predicted block, the client 150 may still (e.g., in parallel) launch a request to its main server 120. In this way incorrectly predicted (or merely prematurely predicted) requests do not block the most recent real request from the filesystem 154. It should be appreciated that either server of servers 120 and 125 can be the main server and either server can be the alternate server. In some embodiments, the system is configured to ensure that speculative data requests are communicated to servers not handling data requests triggered from the client.

Referring back to FIG. 2, in one embodiment, a client system 150 can run multiple proxies 180 each with their own CoW layer. In this embodiment, each proxy 180 can have greater ability to predict what the filesystem 154 operations are executed next because there may not be competition between multiple processes on any particular proxy 180. In some embodiments, a single proxy 180 can have multiple CoW layers 202 and 206. In some embodiments, each CoW layer 202 and 206 can have its own memory 204 and 208, respectively.

In another embodiment, multiple proxies 180 may coordinate with each other to share data in their local cache 184 using a peer-to-peer protocol such as IPFS, or a custom protocol where proxies 180 can query nearby other proxies before asking the server 120 or 125. In one such embodiment, a proxy 180 may act as both a proxy and a lightweight server, answering nearby proxies' requests for data and referring them to the servers 120 or 125 if the requested data is not found. These proxies 180 may also act as overlay servers, where a cluster of clients wishing to share an overlay could all connect first to a particular proxy 180.

Similarly, in another embodiment, multiple servers 120 or 125 or proxies 180 can coordinate to share data from their local caches, avoiding duplication of data in caches. In yet another embodiment, multiple clients 150, 160, and 170 sharing a view of one or more images on the storage unit 110 can connect to the same proxy 180, who could return any data in the image overwritten by one of the clients 150, 160, or 170 to every other connected client 150, 160, or 170 requesting access to the overwritten data. In some embodiments, there can be any number of BX clients 150, 160, or 170, proxies 180, servers 120 or 125, and storage units 110 in an embodiment.

In embodiments using cache hints, some hints can be the result of a complex process of pattern recognition, extracted from access patterns: typically logs of reads from the servers 120 or 125. In one embodiment, the hint generation process is not real time, but instead is done in the background, potentially over relatively long periods of time, with large sets of log data. In this embodiment, the server 120 or 125 does not generate hints in real time, but instead operates from data built by this process. The hint generator in this embodiment, for example, can be configured to determine that reading block 430 followed by 783 means there is a high probability that 784 and 785 will be needed soon. It can create a data set which controls state machines (430, then 783, then send hint) one or more of which can be operating simultaneously. It should be appreciated that the terms "block" and "segment" can be considered to be interchangeable, depending on the embodiment implemented.

In one embodiment, the hint data sent to the proxy 180 can be a list of blocks to read. In some embodiments, the hint data can also include a probability (chances it will be read based on the data analysis), and/or a timeout (a timestamp after which it is highly unlikely the pre-fetched block will be used), or it may push some of the state machine operation to the client 150 if the hint generator recognizes a branch of the hints. For example after hinting through block 785, perhaps reading block 786 greatly increases the probability of 787, 788, and so on, while reading block 666 indicates a different access pattern is happening. While that state machine can run at the server 120 or 125, in some embodiments the branching may also be executed within the proxy 180. In various examples, a cache hint can include a probability variable that can be used to limit execution of the cache hint (e.g., a low probability hint is not executed, a threshold probability can be met for the system to execute the cache hint and retrieve the associated data into cache). In other examples, the cache hint can include a timeout (e.g., based on usage pattern the system determines an outer time limit by which the cache data will be used (if at all)). The system can use the timeout to evict cached data associated with a stale hint, which may override normal caching/eviction ordering.

In some embodiments, the proxy 180 can receive an encoding of a state machine with each state corresponding to a set of blocks to pre-fetch (and/or evict), optional timeouts after which the pre-fetched blocks are unlikely to be useful, and transitions according to future block numbers read. The block number of each new block read can be checked against the transition table out of the current state, and the new state can dictate which blocks should be pre-fetched or evicted based on the new information from the new block read.

Hint generation may use knowledge of higher-level structures in the data in addition to logs of accesses. For example, the hint generator can read the filesystem structure written in its block store and use that additional information to improve hint quality. In the example above, if blocks 786 through 788 are commonly read sequentially, that can be used as input. If the blocks are all sequential blocks of the same higher level file saved in the image, the hint generator may follow the blocks allocated to that same file (even if the blocks are not sequential) and add them to the hint stream.

In another embodiment, hints can include "cache eviction" hints that can allow for branching logic. In this embodiment, the hint generator can provide the client 150 multiple blocks to fetch. Based on the future access patterns, the client 150 can be able to tell that some blocks may not be likely to be used if a particular "branch" block is fetched. For example, the data may frequently include the following two patterns: 430, 783, 784, 785 and 430, 786, 787, 788. In this example, the first block in the two patterns can be the same, but the subsequent blocks can be different. The hint generator can be configured to send the client a hint that if block 430 is loaded, to pre-fetch 783, 784, 785, 786, 787, and 788—but include conditions for execution to handle the multiple patterns. For example, the moment 783 is used then 786, 787 and 788 can be safely evicted, or if on the other hand 786 is used then 783, 784 and 785 can be safely evicted (e.g., as specified by execution conditions in a cache hint).

In some embodiments, the system can be configured to analyze hints having common elements and consolidate various hints into a matching pattern portion and subsequent execution conditions that enable eviction or further specification of an optimal or efficient pattern matching sequence. In other embodiments, the cache hint can trigger caching of data for multiple patterns and trigger ejection of the cache data that represents an unmatched pattern as the clients usage continues and narrows a pattern match from many options to fewer and (likely) to one match. Although in some scenarios a final match may not resolve into a single pattern or execution.

It should be appreciated that the patterns listed here are simply for example, and patterns of any length and/or similarity can be used. It should also be appreciated that this sort of cache hint generation is not restricted to networked storage caches; it can be used for any other suitable caches such as a CPU cache.

In some embodiments, the hint generation may not occur on the server 120 or 125. In some embodiments, for example those using large databases, a running application can know the high-level structure of data within its files, or it can keep its data in a raw block device to remove filesystem overhead. In these cases, the application may have an API to create hints for itself, and execute speculative read requests to fill its cache. In other embodiments, a Hadoop engine, data warehouse software, or SQL Query planner, or any other suitable system can be configured as discussed herein to analyze current data requests and predict row reads and generate cache hints for the proxy 180 and server 120 or 125, for example, if there is a long-running query that enables such analysis. In some embodiments, a cache hint API can be implemented with a database and configured to reduce latency by prefetching the data used later in the query.

In some embodiments managing execution of data requests with a high degree of randomization, pre-loading blocks can be wasteful. To help performance in these situations, the client 150 can also be configured with a simpler cache to account for some jitter in accesses or to account for a full breakdown in which the hint stream is out of date. In one embodiment, the client 150 is configured to monitor its caching performance (for example its hit rate) for every algorithm or hint stream, and if cache performance falls below a certain threshold, the monitoring process can inform the server 120 or 125 that the hints are no longer helping. In some embodiments, the server 120 or 125 can be configured to increase the size of the client cache in response. In some embodiments, the number of jobs running on the server 120 or 125 can be adjusted. In some embodiments, the server 120 or 125 may stop or ignore cache hinting if the cache performance falls below a certain threshold. For example, if cache hint performance fails below a threshold level for a period of time, the system can be configured to disable cache hints for a period of time, client data request session, etc. Disabling hinting when performance falls below the threshold can increase system bandwidth.

In one embodiment, the hint stream (e.g., system analysis of access patterns) can reveal that certain portions of the served image tend to be read together. The system is configured to reorder the filesystem the server 120 or 125 is serving as an image to keep frequently-used data within the same segment of the storage system 110; packing them into likely streams of data. In various embodiments, the system is configured to re-order the served image responsive to analysis of the hint stream that indicates common access elements. For example, re-ordering is configured to reduce the number of independent segments fetched from the storage unit 110, which can also reduce latency and increase cache performance on the server 120 or 125. Various conventional systems fail to provide this analysis, thus various embodiments can optimize data retrieval execution over such conventional systems, for example, as is described herein.

As shown in FIG. 2, the proxy 180 may comprise a read overlay 186. In some embodiments, a client 150 can see its own unique filesystem 154 due to the read overlay layer 186. If the client 150 creates a new file in its filesystem 154, the disk blocks which were changed as a result of the writes can be recorded in the proxy's 180 CoW layer 202 or 206, operating much like a block-level cache, with an extensible data store 204 or 208, respectively. In some embodiments, the CoW layer 202 or 206 can use a write-allocate write policy, under which any data written to the CoW layer 202 or 206 to an address which has not yet been seen by the CoW tags, is configured to allocate a new block in its tags and data. In some embodiments, the CoW layer 202 or 206 may never allow writes to propagate back to the caches or connections to servers beyond it. The CoW layer 202 or 206 can intercept any or all of the read and write requests. According to one embodiment, the write requests received by the proxy can be written to the CoW data store 204 or 208, with the number of the overlaid block and the location in the data store kept in the CoW's cache tags lookup. This cache tag store can be a hash table, or more complex data structure, depending on the size of the table. The cache tag store may also utilize a probabilistic data structure, such as a Bloom filter. Read requests can consult the cache tag store first before passing through to check the Read Cache 184 and then (if the request missed both the proxy's 180 write and read caches 186) on to the server 120 or 125.

In some embodiments, a user can have a large (e.g. several terabyte) data storage unit 110, and wishes to update a small portion of it during a large operation across the storage unit 110, but may wish to make that update permanently available for the future. Saving the CoW 202 or 206 and using it later can save significant disk storage. Instead of duplicating the entire data store, the system 100 can create a new image with references to the original data segments where nothing has changed, and references to separate data segments where the CoW 202 or 206 recorded modified segments. This can allow multiple versions of a large block device to take up a small amount of space where the changed segments are duplicated.

In one embodiment, after a client 150 has made its changes to its filesystem 154 and the changes can be stored in the CoW 202 or 206, it may disconnect from the proxy 180 and save the CoW 202 or 206 to be used in the future as a Read-overlay 186. A future proxy 180 may load in a Read-overlay 186 when mounting a BX image; this can make it appear to be the same as when the Read-overlay 186 was last stored by a proxy's 180 CoW layer 202 or 206. This can allow a modified view of the base image without copying all of the base image data, and persisting changes between sessions of the proxy 180.

In some embodiments, one or more Read-overlay 186 files can be stored separately and made available to proxies 180 when mounting an image. This can provide for easy access to various similar versions of the same large data set.

In some embodiments, a Read-overlay 186, the tags and/or data files can be uploaded to the server 120 or 125 to be made available to any proxy 180 as a derivative image. In some embodiments, the Read-overlay 186, the tags and/or data files can be uploaded to the storage unit 110.

In some embodiments, one client can do a set of setup work and share its output with a set of one or more other client machines. For example, an administrator might upload a year's worth of financial trading data in an image. Each day, a client (e.g., system or device) can mount that image via a proxy 180, then load, clean, and index the previous day's financial trading data. After that, the client can share that Read-overlay 186 so that a large number of other clients could use proxies to perform analysis on the updated data set.

The system 100 stores images as a base file (which contains possible overlay Tags if this image is a server-side overlay, as well as the name of the image the overlay was created on top of) and a sequence of data files, called segments. In some embodiments, these can be large compared to normal disk accesses, but small compared to the disk image as a whole.

Clones can be created by cloning image A to a new image A-prime by creating a new A-prime image file which has no overlay Tags, but a base image name of "A". All reads to image A-prime, segment 3 would look for the file A-prime.data.3 then A-prime.dataz.3 and then A.data.3 and A.dataz.3 Connecting to the A-prime image in Read-Write mode, all writes can allocate a data segment file (copying from the base image first) as needed. Clones, then, essentially use the server's filesystem as its overlay tags. It should be appreciated that this is given as an example of a method for creating clones, and any other suitable method can be used.

An example use case for a server-side clone is to apply a permanent update to a very large image. For example, a client can be configured to operate hundreds of virtual machines (VMs) with the same operating system and analysis software. The administrator can install a service pack on the base image then store the updated operating system and software on a clone. This can enable clients to continue to use either the base image or the updated service pack, which can help with rolling upgrades or easy rollbacks in the event of problems with the upgrade. In addition, this example can limit the amount of extra storage required by using additional storage for the changed segments when needed.

Figure 3:
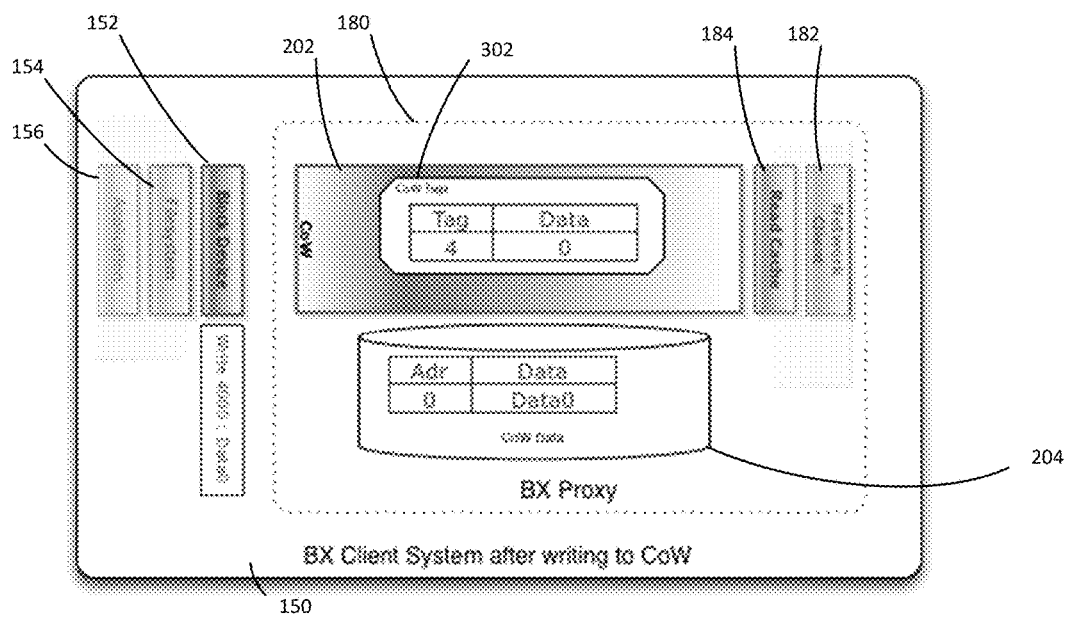
FIG. 3 illustrates an exemplary client device containing a copy on write layer, in accordance with some embodiments.

FIG. 3 shows a client system 150 with a copy on write layer 202 and copy on write data 204. In some embodiments, the proxy 180 can accept client 150 write requests to its device with given data, length, and offset. It should be appreciated that these parameters are given as an example, and any suitable parameters can be used. The write can caught at the proxy's 180 CoW layer 202. For each target block falling within the region defined by the request's offset/length pair, the proxy 180 can check to see if that block already exists in the tag structure 302 of the CoW data 204. If that target block is present, the new block of data can be written to the CoW Data 204. Data can be written by overwriting the old block or by writing a new block and modifying a tag to point to the new block and marking the old block as free, for example. If the target block is not present, the CoW Data 204 can be extended, and the new location in the CoW data can be written as a new tag. The tag can be the original offset block number, or any suitable location reference, such as a hashed location.

As an example, a method for writing to an empty CoW layer is provided. It should be appreciated that the method described is given only as an example, and should not be considered as limiting. For the purpose of this example, the block size is 4 kb and addresses accessed are on block boundaries, in hexadecimal. For simplicity, single-block accesses are shown, but when longer accesses are done, the system can break them up into individual block accesses as needed. For a new CoW layer 202, no writes have yet been done. If the client provides a write request to Write 0x4000 Data0, the CoW layer 202 can look up block 4 in its associated CoW tag structure 302. If the value is not found; a new location for this data is allocated in the next available block of the CoW data 204. Future reads within block 4 (address range 0x4000-4FFF) returns the "Data0" values from within the CoW data 204 rather than reading further up the stack. Reads which are not found in the CoW tags 302 lookup can check the read cache 184 and, if not found there, can be sent through the network client 182 to a connected server.

In some embodiments, the proxy 180 can accept client 150 read requests with a buffer to fill, length, and offset. It can be the proxy's 180 responsibility to decompress any data. As an example, for each possible block within the request's offset/length pair, the client 150 can check to see if the corresponding block number is in the proxy's 180 CoW layer 202 using the tag structure 302. For any block present in the CoW layer 202, the data from the corresponding block can be returned. If not, the request passes up to the proxy 180 to search the Readoverlay, if any, and then the read cache 184. If the request misses in both of those layers, the proxy 180 can generate a network read request to be sent to the server. The proxy 180 can also allocate new space in the read cache 184 for future reads to the same data, if appropriate. Additionally, the proxy read request may trigger a local cache hint state machine to queue up additional server read requests to load the read cache speculatively. In some embodiments, the data stored in the buffer can be encrypted. Any of the proxy 180, client 150, or server can be configured to decrypt the data, based on the embodiment.

Figure 4:
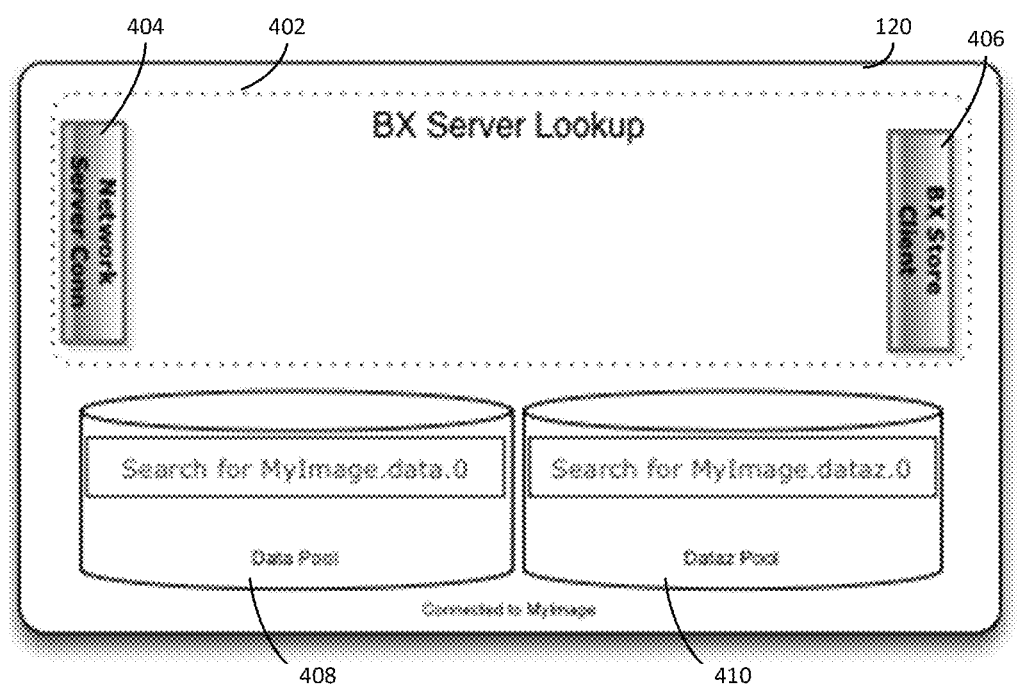
FIG. 4 illustrates an exemplary server device containing server lookup functionality, in accordance with some embodiments.

FIG. 4 shows an example of a server 120 with a server lookup layer 402. If server 120 has a data segment requested by a read request through the network server connection 404 in its local storage, server 120 can first check to see whether a server-side Readoverlay applies by checking the tag structure for the requested block or blocks. If so, server 120 can return the data from the Readoverlay. In some embodiments, one read overlay can be searched, while in other embodiments multiple read overlays can be searched. If server 120 has the data file in local uncompressed storage 408 but no Readoverlay applies, server 120 can return the data to the proxy in a specified format. Server 120 may store the uncompressed/decrypted data locally for future reads of the same segment. In some embodiments, server 120 can also decompress or decrypt the appropriate segment as needed. If the server 120 does not have the data segment, server 120 can generates a network read request to the storage unit through the storage unit client 406 to fetch the segment or segments containing the data in the read request. Compressed data can be stored in the compressed storage unit 410. It should be appreciated that in some embodiments, a server 120 may have one of uncompressed storage 480 and compressed storage 410, or both.

While in some embodiments, the server 120 uses a pre-generated hint stream to send hints to the proxy suggesting blocks to be pre-fetched, server 120 may internally maintain a set of hint state machines to prefetch .dataz segments from the storage unit, or to decompress .dataz segments to their .data form within the server 120.

In some embodiments the server 120 may contain compressed data blocks. Compressed data blocks in the server 120 can be created once, when the image is created. In some embodiments, if the image is modified, data segments which are marked can be recompressed. In some embodiments, the administrator can compress and store blocks to the storage unit. Blocks fetched from the storage unit on behalf of authorized clients can be decrypted by the server 120, and then stored and sent to the clients encrypted with a session key particular to that client and/or session. Clients thereby do not have access to decrypt any data other than that provided by an authorized BX session. In some embodiments, the administrator and clients exclusively possess the encryption and/or decryption keys, and the data stored on the storage unit can be received in encrypted form by the server 120, and transmitted to the clients in encrypted form.

Figure 5:
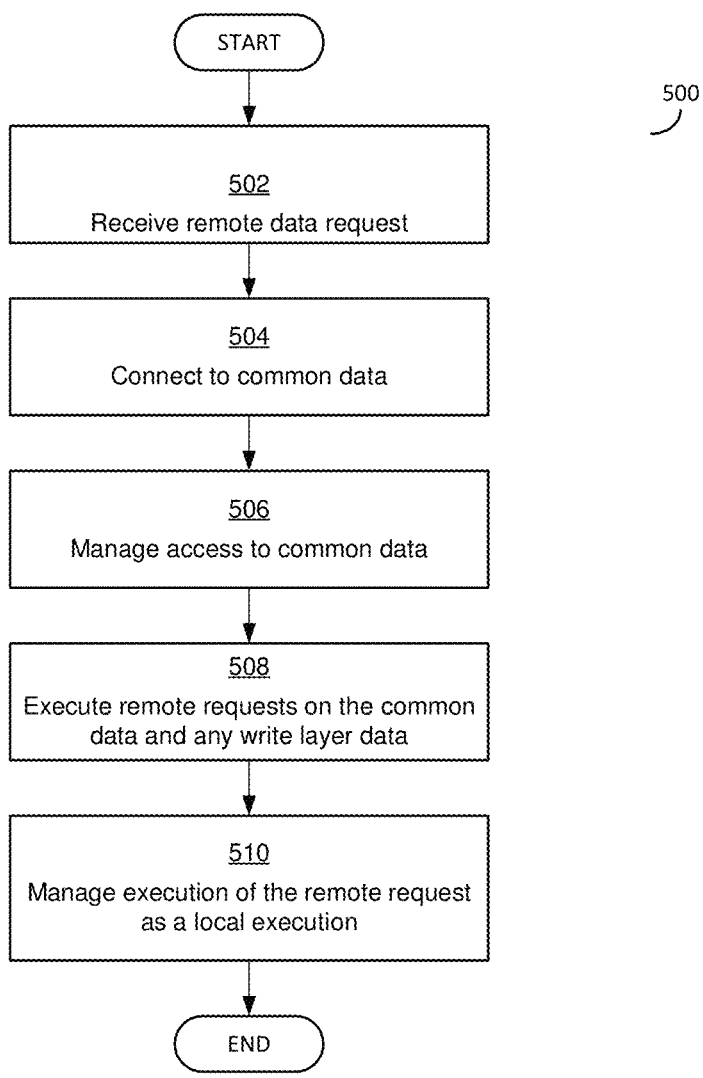
FIG. 5 is an example process flow for managing a distributed data storage, according to one embodiment.

FIG. 5 shows an example process flow for managing a distributed data storage. The process begins with step 502, where a remote request from a client device is obtained. The remote request can comprise a request for access to common data hosted on a storage unit, for example. In one embodiment, the remote request is generated by a client device and received by a proxy unit. At step 504 the proxy unit manages the client data request, for example, the proxy unit is configured to provide access to the common data for the client device. According to one embodiment, step 504 can be executed by any proxy unit as described herein, or any suitable combination of the proxy units described herein. In some embodiments, the proxy unit provides access to a portion of the common data for the client device. For example, the client device may be authorized to access a portion of the common data, or the client device may request a portion of the common data in the remote request.

In step 506, access to the common data is provided based on a layered architecture including a first write layer. For example, a client device can access a portion of common data via a first proxy, or in some alternatives the first proxy can manage access to a complete data set for the client device. In further examples, access to the first write layer can be executed by the system as described herein. For example, the proxy unit may contain a write layer which, in some embodiments, can be stored, distributed, and/or reused by other servers or proxy units. In some embodiments, the server may contain a write layer which can be stored, distributed, and/or reused by other servers. The server and the proxy may manage the access to their respective write layers.

In some embodiments, the write layer is configured to manage write requests on the common data issued by the client device. For example, the write layer enables the client device to utilize a common data core that is modified by a write layer reflecting any changes to the common data made by a respective client device.

In step 508, the remote request is executed on the common data and any write layer data as necessary. For example, the proxy unit can manage execution and retrieval of data from the common data and/or any write layer (e.g., locally, through a BX server, respective caches, and/or BX store). In some examples, the proxy layer can be configured with a local cache of data to be retrieved, and source data requests through the available cache. Accesses through other system can also be enhanced through respective caches (e.g., at a BX server).

As discussed, executing the remote request on the common data can also include accessing data stored on a server between the proxy unit and the storage unit, or sending an indication of the remote request to the server. In step 510, the remote request is executed transparently to the client device as a local execution. For example, a proxy unit appears to the client device as a local disk or file system. The client executes data retrieval or write requests through the proxy unity, which handles the complexity of cache management, work load distribution, connections with data servers and/or data stores. In some embodiments, this can comprise making the proxy unit appear to the client device as a local storage unit. It should be appreciated that any of the various components FIGS. 1-4 can execute the steps described herein in any suitable order.

Figure 6:
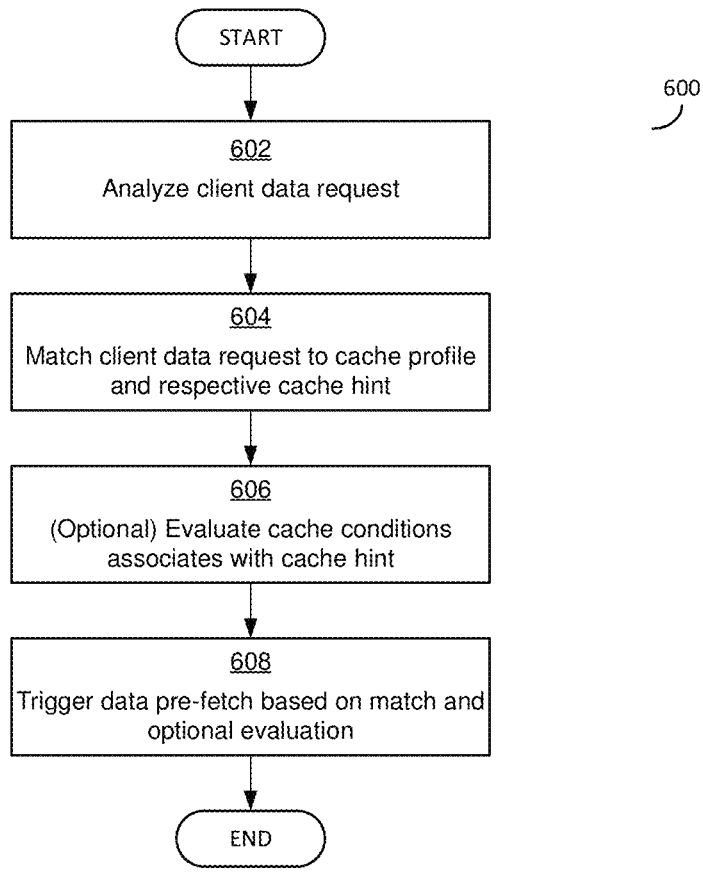
FIG. 6 is an example process flow for managing caching within a distributed data store, according to one embodiment.

FIG. 6 shows an example process flow 600 for managing caching within a distributed data store. The process begins with step 602, where a remote request from a client device is obtained and analyzed. The client device can send a request for access to data from a remote storage unit, for example, and the request can be received by a proxy unit or by a server. At step 604, the proxy unit or server may match the client data request to a cache profile and respective cache hint. The cache profile can be a profile that is substantially similar to the client data request in terms of the locations in memory of the storage unit or other memory space that the client data request is attempting to access. For example, if the client data request is attempting to access blocks 430 and 783, the cache profile may correspond to blocks 430 and 783. The respective cache hint can be associated with the cache profile, and contains at least one suggested memory block to access next. For example, if clients typically request access to block 784 after requesting blocks 430 and 783, the cache hint may suggest block 784. In some embodiments, cache hints may comprise cache eviction hints, with branched options, as described herein.

In step 606, the proxy or server can evaluate cache conditions associated with the cache hint. It should be appreciated that not all embodiments may utilize step 606. If cache performance falls below a certain threshold, the monitoring process can inform the server or proxy that the hints are no longer helping. In some embodiments, the server or proxy may increase the size of the client cache in response. In some embodiments, the number of jobs running on the server or proxy can be adjusted. In some embodiments, the server or proxy may stop or ignore cache hinting if the cache performance falls below a certain threshold.

In step 608, the server or proxy may trigger a data pre-fetch based on match, and optionally the evaluation from step 606. The data pre-fetch may utilize the cache hint to pre-fetch the data stored in at least one block suggested by the cache hint. In embodiments with the evaluation from step 606, the server or proxy may ignore the cache hint if the cache performance has fallen below a certain threshold. In some embodiments, the server or proxy can use a state machine with each state corresponding to a set of blocks to pre-fetch (and/or evict), optional timeouts after which the pre-fetched blocks are unlikely to be useful, and transitions according to future block numbers read. The block number of each new block read can be checked against the transition table out of the current state, and the new state can dictate which blocks should be pre-fetched or evicted based on the new information from the new block read. It should be appreciated that any of the various components FIGS. 1-4 can execute the steps described herein in any suitable order, and in some embodiments, may combine or execute in parallel any of the described steps.

Figure 7:
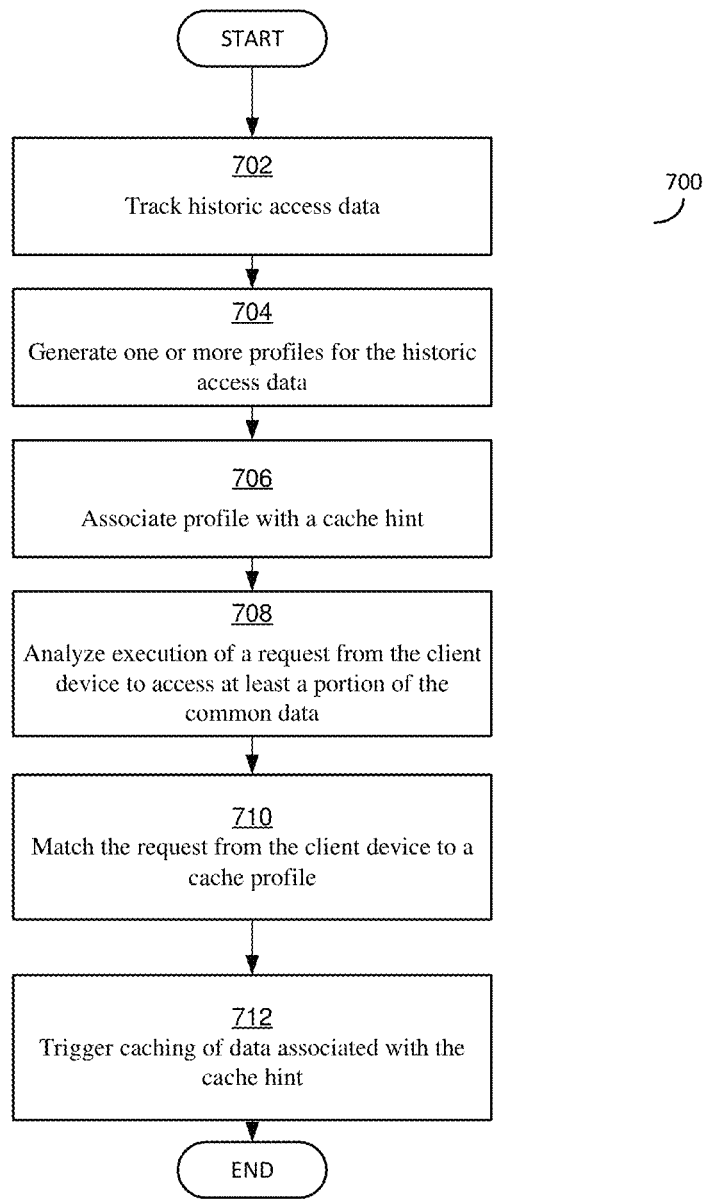
FIG. 7 is an example process flow for managing caching within a distributed data storage architecture, according to one embodiment.

FIG. 7 shows an example process flow 700 for managing caching within a distributed data storage architecture. The process begins with step 702, where the system can track historic access data. The access data can indicate which memory blocks get read in what order based on various previous accesses of the data. In step 704, one or more profiles can be generated based on the historic access data. The one or more profiles can be a series of block locations or addresses that may occur frequently in the historic access day or can be inferred as probable from the historic access data. In some embodiments, the one or more profiles can also include one or more branches, as described herein. In step 706, the one or more profiles can be associated with a cache hint. The cache hint can contain at least one suggested memory block to access next, based on the one or more profiles.

In step 708, a remote request from a client device can be obtained and analyzed. The client device can send a request for access to data from a remote storage unit, for example, and the request can be received by a proxy unit or by a server. The analysis can comprise determining what memory blocks the request is configured to access, for example. Based on the analysis, in step 710, the request can be matched to a cache profile. The cache profile can be a profile that is substantially similar to the client data request in terms of the locations in memory of the storage unit or other memory space that the client data request is attempting to access. For example, if the client data request is attempting to access blocks 430 and 783, the cache profile may correspond to blocks 430 and 783. In step 712, the respective cache hint can be associated with the cache profile, containing at least one suggested memory block to access next, and caching of data associated with the cache hint can be triggered. For example, if clients typically request access to block 784 after requesting blocks 430 and 783, the cache hint may suggest block 784, which can trigger caching of block 784. In some embodiments, cache hints may comprise cache eviction hints, with branched options, as described herein. It should be appreciated that any of the various components FIGS. 1-4 can execute the steps described herein in any suitable order.

Use Case Examples

According to another aspect various embodiments are directed to improving utilization and efficiency of conventional computer system based on improving integration of network-attached storage. In some embodiments, network attached storage can be used for computer systems, providing advantages in flexibility and administration over local disks. In cloud computing systems network-attached storage provides a persistent storage medium that can be increased on demand and even moved to new locations on the fly. Such storage medium can accessed at a block level or at the file layer of abstraction. Some such use case examples are provided below.

Various implementations of a distributed data storage system can be used in a variety of settings. For example, some settings can be based on the type of compute problem being resolved. Implementation examples for the distributed data storage system, optimizations, functions, algorithms, and process flows are discussed in below. Various examples are discussed with respect to a_xNBD ("Network block device"), cNBD, and/or sNDB, which are used to describe various implementation examples of the distributed data storage system (including, for example, a BX system and embodiments) and to provide examples of considerations for compute problems resolved by various implementations. The specific functions, optimization, and/or examples of the xNBD and BX system, are configured to be used in conjunction and in various embodiment, can be combined to achieve additional optimizations and/or combined functionality. Various architecture examples for the BX system and xNDB devices describe overlapping elements, that can be used in conjunction, combination, and/or as alternative elements.

According to some embodiments, certain classes of computer problems can be split up to be executed in parallel on several cores of a single machine or even on several separate machines in a cluster. The processes executing on these parallel CPUs can execute in a tightly coupled manner, sharing data and intercommunicating frequently, or execute the same class of problem on slightly different data sets with little or no sharing or communications. Various aspects provide implementations that solve a host of issues associated with independent parallel jobs. In addition, further complexities arise if one wishes to offer flexible clusters for computation as a cloud service. In some cases, various embodiments are architected to handle various customers with slightly different platforms and OS needs, and the in some examples the system and/or architecture accurately serves different platforms and different OS needs without requiring a unique file system image for each customer.

According to some aspects, independent parallel jobs may run tens to hundreds of jobs in parallel. In some cases, input data sets range from megabytes to gigabytes. Output data is typically megabytes, in some embodiments. In one embodiment, independent parallel jobs can include parallel execution of software regression tests. In this case, all of the jobs start with the same code and data. In some embodiments, the code and data include the software to be tested and the routines to be executed as tests, as well as supporting data sets. The difference in the jobs can be which test is to be run or which starting condition data set is provided. In some embodiments, the output of each test run can include any one or more or combinations of: whether the tests executed correctly (passed), the time used to execute the tests, a log output from the executions (warnings), code coverage from the tests, and the ending data state.

A regression test suite can include hundreds or thousands of tests to be run, each starting from an initial condition and resulting in the desired "pass/fail" result. The output can also serve as warnings of problems other than simple correctness, or can be presented when the test fails. For example, code coverage output, when recorded, is configured to be merged with the output of all other tests to determine the total code coverage of the test suite. In some embodiments, as the tests run, the test execution occur in isolation and do not communicate with each other.

Example Embodiments: Hardware Synthesis

According to various embodiments, synthesis of hardware output from high-level design input is a complex problem. In some embodiments, a starting random number seed can be used as part of its algorithm for performance optimization. For example, in execution, the system optimizes its results in various constraint axes, attempting to meet the desired results. According to some embodiments, at times the algorithm may find a "local minima" of results in which small perturbations in any direction seem to make the result worse, while pushing one or more of the inputs further from the starting point yields a much better result. The random number generator can be used as an input to this process. With randomness injected into the execution by the system, two independent runs of synthesis starting with different random number seeds can yield much different results. Restarting the entire run or simply continuing on a single machine can be time-limited, but running the entire job on independent machines, for example, starting with the same large initial data set but different seeds provides cost-effective solutions in a timely fashion. In some embodiments, the jobs run independently of one another, but only have their final outputs compared.

Optimizations Examples

According to some aspects, the layers described in greater detail below can be used with various components of hardware and software which make up an entire system executing the parallel processes. In some embodiments, the parallel processes can be related to software testing. In one example, a cluster of 10 Linux machines can be prepared to run the tests. Under some instances (for example, a naïve implementation), every machine would be completely reloaded each time the tests must start with for example initialized file systems, operating system, all supporting software, "customer" target software to test. Naïve implementation guarantee identical starting conditions for all tests, but at great performance costs and prohibitive resource allocation. For example, such an approach incurs great bandwidth costs just in transferring all of the supporting files over and over. Various embodiments resolve these issue presented by conventional system based on improved efficiency and improved utilization of shared resource.

Volume Level Examples

According to some embodiments, the engineer setting up the test environment would start from the premise that the testing process does not alter the lower layers, for example, that comprise operating system files, supporting programs such as database executables, etc. Based on such a premise, the tests can be configured to run without privileges necessary to alter those files. In the example introduced above, the system is configured to execute tests based on building up a testing environment image (for example, (up to and including Layer 7 described in detail below)) which is copied onto all of 10 machines in the cluster, and then each time one wishes to run a new run of tests, one may check out the entire code base from a source code management system on each of the machines, run any needed compilations, and begin running the parallelized sets of tests split among the available systems. This has the undesirable effect of causing a great deal of IO traffic from a single source such as the source code management system to start things up. According to aspects of the present disclosure, an improvement to this example can include configuring the system to have only one of the machines check out the code, and then become a cache for the other machines executing the tests/test suite. In other embodiments, other arrangement of caches may also be provided.

File System Layering Examples

In some embodiments, container-style virtualization of jobs presents its running environment with a general filesystem shared that may execute read-only plus a region which is private to the running container. In some examples, this can be implemented through a layered filesystem such as AUFS or LayerFS with the lower layer being the shared part and the upper layer unique to the container.

Precompiling Shared Workspaces with Copy-On-Write Examples

According to some aspects, using filesystem layers includes freezing a full filesystem image at the highest layer practical (i.e., incorporating the largest base of common computing elements possible), and the system can be configured to make the image available to all instances about to launch. In some embodiments, a copy-on-write (CoW) aspect is enabled on the system, and used to keep different output from various containers from interfering, while the system is configured to manage sharing the read-only portion.

Pre-Caching Commonly Read Data Examples

In one example, an xNBD (Network block device) proxy supports a local read cache as well as the copy-on-write overlay. According to some embodiments, this read cache can be configured to be frozen (e.g., captured from a system after a run), and deployed to multiple VM's running the same or nearly the same task sets. This greatly reduces network traffic (e.g., over conventional systems) and latency for subsequent system runs. According to one embodiment, a post-processing step can be configured to consolidate the read caches from all VM's reading from the central xNBD server and build an even higher hit-rate pre-cache. According to various aspects, these techniques can be applied to any shared storage protocol, not just NBD-like protocols, and achieve similar improvement in efficiency, execution, and resource utilization.

In one example, the loading of the pre-cache file (which can be compressed) is configured to come from the base server, or in another example the loading could come from fan out from intermediate hosts which have already had their cache blob loaded, reducing the central xNBD server overhead.

NBD Proxy Sharing Examples

In some embodiments, the extended NBD implementation xNBD adds the implementation of copy-on-write and a local cached proxy to the older NBD block sharing. Other embodiments, can include further optimization using a VM-wide shared proxy, which offers unique copies of the target disk/filesystem to multiple containers running on that VM. This example enables a shared read cache between all container clients and also makes better use of OS-level caching if the proxy's local storage is in files rather than raw devices. This implementation example is hereinafter referred to as sNBD, or Shared Network Block Device, although these techniques are not limited to NBD or NBD-like protocols, and can be used in conjunction with any embodiment discussed herein.

Layer Compilations from Block Diffs Examples

In some embodiments, a target sNBD server may work from a full disk image and in some examples, the server is not needed to make decisions of what block to serve dynamically as the blocks are requested. In this example, the server does not require that every previous snapshot image must also be stored somewhere. The snapshot process for a high-level image can be generated, for example, by applying the latest set of block changes at the CoW level to the previously cached image, generating a new one. Another alternative is based on each of the write overlays at the CoW level being saved, and enables a generation of a new final image from an initial fairly low-level image, plus the application of successive CoW levels which were stored, even in the examples where the full intermediate image work product was not. Embodiments of the system are configured to go back to a lower level and build from there without having to keep a full image. In some embodiments, it may not be possible to apply the highest level CoW to anything but the image the CoW had worked from. In some embodiments, correct results may not be reached by simply applying to a lower level work product. The system can be configured to test for such conditions, and/or validate construction of new images to ensure proper construction.

Server Subdivision of Raw Block Device Examples

While the target server can use files to hold its images and the block differences are maintained as files, access to a raw block device rather than through a file system layer can be configured and provide greater efficiency. For example, the compiled output of an image can be just one portion of a larger block device available on the server. In some examples, the image is contiguous, but can lose the possible advantages of using sparse file.

Image Server Availability Examples

According to another embodiment, the base image blobs to be served by a target server can be stored on a reliable service such as S3. According to one embodiment, the connection process to "the server" is configured to connect to a broker first which redirects the client (proxy) to an actual server which can already have the image cached, or if not, sends the server the correct commands to get the image blobs or compile them from the reliable storage service. The server can be selected based on system analysis of server network/CPU load and/or space availability.

Access requests to read-only server images can be configured to return a list of servers with the available bits, allowing the client to choose from among them. With this knowledge the system or client can manage client requests, for example, it would be safe for the client to make any request to any server in the list, retrying with a different server if necessary.

Dynamic Pre-Caching and Cache Control Hints from Previous Run Logs Examples

According to an aspect of the given model, most runs have very similar file access patterns. In one example, an optimizer is configured to run a separate filesystem monitor process which looks at the system calls to open/close/read/write for all processes to be optimized. In one phase, the monitor simply captures the call order. In some embodiments, capturing is executed by the system in further phases as well. In subsequent phases, once the monitor has data to work from, the system/monitor process is configured to use the data from upcoming file reads to pre-load the needed blocks. In one example, the needed blocks are pre-loaded into a ram cache. In another example, the needed blocks are pre-loaded to a local disk. According to some embodiments, the trace data can also be used by the system to optimize cache ejection choices.

As an example, a test program is provided to read in the entirety of file1, file2, file3, . . . file 100. In this example, this trace occurs every time so the trace has a high confidence level. Also, the program reads them only once and doesn't go back and re-read any of the blocks. According to one embodiment, the optimizer process is configured to, upon seeing file1 opened, perform a pre-read of file 2 with a note for the system that file 2 should go in ram cache, and with set conditions to be evicted immediately upon use. When file 2 is opened, the conditions trigger the same operations for file 3, etc. In further embodiments, the optimizer includes machine learning heuristics and are applied to the gathered datasets to learn patterns that are not intuitive to human perception, but nonetheless, can be used to improve execution performance.

According to some embodiments, cache hints need not be generated on the client although some dynamic cache logic is configured to reside on the client. The stream of access events either block- or file-level could be sent in the background by the client to its server. In some embodiments, the server can be the same server which is providing the original disk bits. The server would be able to analyze the access patterns at leisure to generate a set of cache hints for future runs or alternatively the server would do nothing, if this access set is generally the same as previous ones.

Various embodiments incorporate analysis of one or more or any combination of: statistical techniques, optimization algorithms, machine learning, or other methods. These cache hints generate information such as the answers to, for example:

1. How much RAM cache is warranted?
2. How large should the cache blocks be? The network transfer blocks?
3. What information should be pre-loaded to RAM cache?
4. What information should be particularly transient in the RAM cache?
5. What is a good cache eviction algorithm for this data set?
6. What information should be particularly sticky in cache once it is eventually called for?
7. What triggers can signal pre-loading of later sets of cached information?

According to some embodiments, cache designs are generally optimized around hardware limitations first, and then software/memory limits. In conventional computing cases, these optimizations would not pay off if done at runtime. Even done independently, with independent cores, conventional approaches would rarely have information that was useful in time to use it. According to one embodiment, the system is configured to examine execution access patterns as a post-mortem analysis, and the port-mortem analysis used by the system to make better execution decisions. For example, post-mortem analysis can be used, because the same job or ones very similar to the job can be re-run often, various system embodiments can use this independent processing expenditure to improve execution efficiency over conventional approaches.

In some embodiments, the execution of the cache hints need not be done at the client. The server can get a request for block X, for example, and determine through recalculated hints that the client will soon make a request for block Y. The system could return the data for block X and also the data for block Y, along with a set of hints that are configured to establish how long the cached data should stay in a RAM or local disk cache. If four separate containers are running and all four are likely to need block Y, for example, the system establishes how long (e.g., a time period the data or execution parameter) the data should stay in RAM (e.g., until the fourth request). In one example, the containers may each be using the source data with separate CoW layers so that the containers are configured to consider the source data as one of four logical storage devices. In some examples, the containers cannot share filesystem caching for that block (as above where the container view the source data as separate logical storage devices).

According to aspects of the present disclosure, other volume-level optimization are configured on various embodiments of the system that include one or more or any combination of: preprocessing images or commonly read-shared data such as source code management systems. Examples include: (1) Using a CPU-intensive high-compression algorithm (e.g., once) server side as a preprocessing step to save on memory, storage, and bandwidth for the cache. A suitable algorithm may also allow for optimizations that allow for very fast decompression algorithms by the client; (2) Using a fast/low CPU usage compression algorithm on the write path to get some bandwidth and storage improvements but not introduce too much additional latency (dual of 1); (3) re-processing disk images for performance—for instance co-locating related metadata in a read-only image to speed up reads, reorganizing image layout based on trace-driven, history-driven, or model-driven algorithms; (4) Post-processing client writes—for instance recompressing writes offline with a more costly algorithm, reorganizing image layout based on trace-driven, history-driven, or model-driven information; (5) Using a trace-driven, history-driven, or model-driven approach the system may identify blocks for pre-fetching. These can be blocks that are always or frequently requested at system startup. These also can be dynamically predicted blocks based on any number of machine learning or deep learning algorithms. The client may also be able to send pre-fetching hints or predictions to the server as well; (6) The system may use deduplication methods to identify blocks in common within or across multiple VM images, filesystems, users, etc. to reduce cache footprint or bandwidth used; (7) Distributed or peer/idle nodes in the cluster may serve as alternate block servers or sources for pre-fetched blocks using any of the above methods.

In some embodiments, pre-fetch hints are hints, and not pushed data. According to one embodiment, the server is configured to determine with a high probability that the client is about to ask for block N+1 after reading block N, it is also possible that block N+1 still resides in the client's cache. Implementing a hint instead of the data allows the client which has more information than the server about the state of its cache to ignore the hint if the operating scenario is not improved by executing a caching operation. In some alternatives the hint can be configured to execute as a "touch this block as least-recently-used" command, causing the block of interest to stay in cache longer.

In some embodiments, clients and file servers are configured to cooperate to manage block caches across hosts. In one example, the fileserver can include a repository of traces, history, and models; the clients may process metadata locally or push metadata to the servers; and the servers are configured to distribute models to the clients so that the models can be efficiently executed either at the client or at the server. In various embodiments, this allows both client and server to generate cache hints, take actions speculatively, and monitor both local and remote caches.

Choosing Cache Hint Stream Examples

In some embodiments, the cache hint stream which may contain instructions for the server and/or the client is configured to be optimized for a specific job, and can improve execution based on analysis of access logs gathered from future runs. The hints chosen to be used for a given job are named in some way. This naming/choosing may have an amount of fuzziness to it. According to some embodiments, initially as part of choosing the image to be served a job may simply match the underlying OS being run such as "ubuntu14", but after gathering data, the job may include the name of the job as well, such as "full_system". The system can be configured to re-name or modify file name to further include version or release numbers as well. The system can be configured to analyze version numbers (e.g., seeing higher version numbers changing may indicate less correlation with an earlier versioned hint stream and that a new stream should be generated). Naming functions can be executed to include release numbers that can indicate a source code repository version, and can expose a metric of differences from the version known in a hint stream such as simple lines of difference between the versions or more.

In some embodiments, the system is configured to analyze how expensive the process of generating a hint stream is and apply predictive model to determine expense of future hint stream generation. If the process is not expensive (e.g., below threshold processor consumption, memory, etc.), the system is configured to generate a new hint stream and use the most recent stream. In some embodiments, a given user can be running older versioned jobs as well as newer ones, so older streams can be made available.

Speculatively Sending Data Examples

Part of a hint stream can be an instruction such as "asked for block 17, and previously quickly asked for blocks 18-60 so the system is configured to automatically send those" to pre-load the cache. According to some embodiments, this operation can be broken up into two parts: first, quickly satisfy the initial data read (and perhaps a block or two beyond), then (e.g., immediately) send a larger transfer up through block 60 (in this example). In this way the network latency for the long transfer does not slow down the initial few accesses, but is instead overlapped with whatever processing happens on the client to get the client to eventually ask for blocks 20, 21, and so on.

Detecting Changed Access Patterns Examples

According to aspects of the present disclosure, there can be corner cases which may break caching algorithms. In this scenario a high degree of randomization could cause pre-loads to be wasteful. To help performance in these situations, the client is configured to fall back to a simpler cache to account for some jitter in accesses or even a full breakdown in which the hint stream is out of date. The client is configured to monitor its caching performance such as its hit rate and if the performance falls below a certain threshold should inform the server that the hints are not helping. One reaction to this can be to increase the size of the client cache somewhat (in some examples, this approach may not always be safe). The information that the caching is less efficient and that a larger ram cache is needed can be communicated to a higher layer of the job control hierarchy and which manages such conditions so that, for example, instead of running 8 jobs on this system, the running jobs should be limited to 7 allowing the cache may grow. According to some embodiments, the hint stream contains predicted cache hit rates to help set the threshold at which hinting can be ignored.

Impact of Higher-Level Caching Examples

According to various aspects, caches are inherently non-linear and designed to leverage locality of references seen, keeping only the most important accesses in local fast storage. In some embodiments, a simple NBD cache between an application and a server will have wildly different request patterns the second time the application is run, not because the NBD cache accesses are so different, but in many cases the NBD cache will identify very few accesses at all. In one example, one test may have about 10 k accesses the first run, and a few dozen during the second run. This is because there is also an operating-system controlled file system cache between the NBD cached driver and the application itself.

Automatically Expanding Space Allocated to Overlay Data Examples

In various scenarios it is recognized that if a block proxy server offers read-write access to a 100 GB image to 10 local clients, the block proxy server can use 1 TB of storage locally in case every block of the image is overwritten by every attached client. Dedicating this much attached storage to this purpose would be wasteful, however, as most client jobs would only ever write to a small percentage of the blocks. According to aspects of the present disclosure, rather than connect to a 1 TB storage device for overlay data in the above example, the proxy server may either start from a predetermined size per client e.g., 10, 15, or 20%, among other options) or use the size recommended from data pulled from a previous run along with the read pre-cache (e.g., based on modeled size usage), or even the dynamic pre-cache data described above. In the event that the system needed more copy on write overlay space than had been allocated, the proxy server is configured to dynamically connect to additional storage such as EBS (Elastic Block Store) resources, releasing them when done. In some alternatives, over-allocation operations can be executed from the target image server instead of allocating a full EBS-style volume. These extra blocks may not be frequently used after caching effects at the proxy level so the load on the image server would not be great. In one example, the system is configured to keep this job in a central server (e.g., more efficient use of bulk resources) rather than having the granularity of allocating 100 GB to a proxy system as the image server offers services to many at once.

Distributed RAM Cache Examples

Aspects of the present disclosure relate to serving a shared disk image to multiple VMs in a cluster. In some embodiments, the various proxy servers on each worker VM are configured to leverage available RAM used by the proxies as a shared cache. In on example, a read cache miss causes the system to check other peer proxy servers before bothering with the target NBD server.

Data Authentication or Encryption Examples

In some embodiments, data served from the target server is configured to tag blocks with an HMAC (keyed-hash message authentication code) using a shared key to keep the clients from accepting modified data. In less secure environments the data stream can be encrypted as well. In some embodiments, NBD implementations are configured to trust the IP checksums to assure data integrity (in some examples, this approach can be suspect). In one embodiments, any such checksums could include the shared key to result in an authenticated read data stream.

Key Management and Trust Model by Storage (Target) Server Examples

In some embodiments, given that a worker VM may push an image change set up to the target server for future reuse, the changes made can be tagged according to the user making them, disallowing one user from ever pushing changes or requesting to an image used by a different user. The system is configured to manage the possibility that one tenant in a VM may gain control of all keys known in that VM and could then make target server requests as a different user. Ultimately, this is a fairly low probability event which can be avoided by the (potentially expensive) step of only allowing one trusted tenant in a VM before restarting the image entirely. An intermediate step can be used by the system to keep a provenance of images written along with the keys associated with their writes and the trust level associated with those keys; in other words a write from a VM which has only ever run code from one user/customer would be trusted more than a write done from a VM which has not been restarted between different users' tenancy. Various examples can execute either approach, although opting for the former trust model would be more expensive.

Layer Set Descriptions

According to an aspect of the present disclosure, layer set descriptions allow a system compilation based on the best available base layers, reducing compilation time. Image lookups can result in a key to find the desired image to be used in the next step. In some embodiments, that key can be configured to request an indirection to actually find the target server holding the image bits. In some examples, this indirection allows the system to move the source image from one target server to another for load balancing or even to allow parallel target servers to offer the same image to many clients.

Create & Push Snapshot to Target Server

In some embodiments, one may frequently create a new snapshot and make the snapshot available to many clients immediately to execute, for example during early stages of the build process. Part of the Worker Image Management (naming/describing images) includes the ability to easily push a current snapshot state with new associated tags so that the snapshot will meet desired parameters. Future clients of the target server would then be able to attach to that image easily.

Share Snapshot from Originating Worker

An alternative to pushing the snapshot layer(s) to a central server, includes configuring the system to have a proxy process on the worker which did the setup work serve the layer-set to all other containers on the current VM and/or on other VMs. This configuration allows sharing a RAM cache of accesses of that overlay. If the overlay is transient, it can be beneficial not to copy the cache in its entirety; as some parts may not be accessed. Thus, some example can model usage of the overlay and only copy needed portions.

Various conventional approaches (including for example, docker-style container systems) can implement AUFS or DeviceMapper to provide a large number of runtime layers, which correspond to their Dockerfile recipes. Generally, conventional implementation and description are not concerned with identifying and/or pre-compiling at a highest layer and rather use runtime layering. Other inefficiencies of conventional approaches include generally targeting many container instances of different containers and provide no analysis of or contemplation of sharing between many copies of the same container on a system. Further issues with conventional approaches include: most work on generating sets of containers over a network in a cluster is done as a deployment strategy and not for parallelization; docker container are fairly freeform, rather than defining dependencies closely preventing targeted architectures with execution efficiencies. For example, a job profile (many instances of nearly the same system set) makes pre-caching likely to provide a high hit rate, overcoming its initial traffic costs.

According to various aspects of the present application, a layer set can be used as a result of a executed set of "setup" routines. In one case, the entire setup process can be performed on multiple virtual machines where each is configured to run a set of "setup containers" which distributes the result of the setup process in parallel to all virtual machines that need to start from the setup result. In some embodiments, using caching optimizations would reduce IO latency that would have been added as a result of using a common network to distribute the setup result.

System Software Layers Examples

In one example related to software testing, various sets of software can be installed and made available can be thought of in layers of decreasing volatility (e.g., shown in Table I). The highest-numbered layer is the most likely to change from one test run to another, while the lowest layers are extremely unlikely to be re-specified from one run to another, unless the test process is to confirm cross-platform compatibility or a platform change is in process.

TABLE I

| | Name | Variables |
|---|---|---|
| 1 | Compiled Customer Code from SCM | branch or other checkout identifier, along with repo identifier |
| 0 | Latest Customer Code from SCM | branch or other checkout identifier, along with repo identifier |
| | Customer Test Database State | Pre-built database images to load quickly for tests. |
| | Customer Repo Cache | Shared among multiple instances on a single VM |
| | Customer Bundle Installs | gem file spec or similar |
| | Customer Package Installs | package requirements (name, version, dependencies) |
| | Parallel Control Agent and other installs | usually latest, but possibly enabling older versions as well as new versions in pre-release |
| | Common Packages installs (psql, etc.) | package requirements (name, version, dependencies) |
| | OS Patches | List of applied patches |
| | OS Base | linux, windows, etc. Kernel version |
| | CPU Architecture | i386, amd64, arm7, etc. (This does not include specific differences related to performance or system size such as amount of memory or number of cores. It is unlikely to expand beyond Intel architectures in the near future but enabling testing for mobile would require ARM.) |

FIGS. 8A-8D illustrate parallelizing a job across multiple virtual machines. According to some aspects, a job which can be parallelized across many containers can be spread across many virtual machines. Containers are lightweight isolation mechanisms which can execute on a raw computer's operating system, or that of a virtual machine. When distributed in this way, the virtual machines typically are the sole occupants of their host hardware, and are used for ease of administration. A discussion of an exemplary brute force implementation is provided below, both with and without parallelism, in order to illustrate the layer optimization.

Figure 8A:
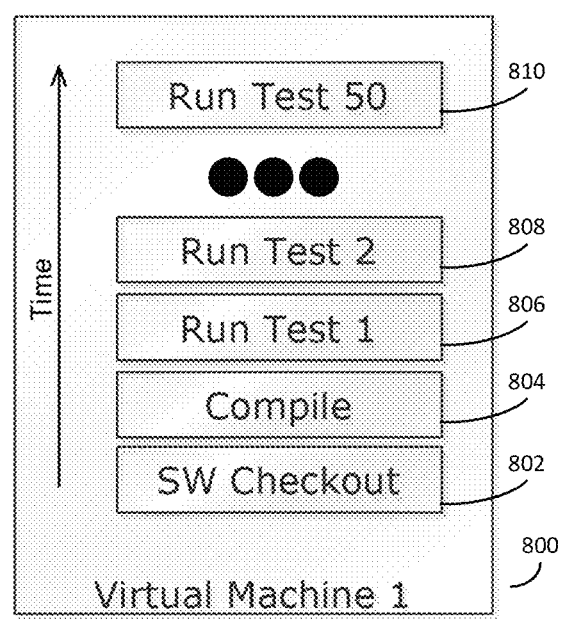
FIGS. 8A-8D illustrate parallelizing a job across multiple virtual machines, in accordance with some embodiments.

In the example of FIG. 8A, the build/test job runs on one container and one machine 800; the job expects a known compatible operating system and some commonly used software packages (for example the gcc compiler suite, and the git version control system). The process needed to complete the build uses the version control system to clone, or download a copy of the latest set of source code and tests from the source code repository in block 802, then the build process (often driven by a make file or equivalent) causes the source code to be compiled in block 804 to executable form. Next the system runs tests on the compiled code. In one example, there are 50 tests to be run, shown as blocks 806, 808, and 810, and the tests 806, 808, and 810 could be run independently of one another if isolated from each other. In one example under consideration, the tests 806, 808, and 810 may alter files during their execution but the tests 806, 808, and 810 were written without consideration for each other, so that if the tests 806, 808, and 810 all ran in parallel on one common filesystem, the tests 806, 808, and 810 would unpredictably collide with each other in their filesystem writes, with unpredictable results such as errors. As a result, in a simplistic approach, the system can be configured to run them one after another. At the end, the system saves the test's log and erase all changes, and then starts the next test. This is robust but cannot exploit the parallelism available in today's computer systems. It should be appreciated that the number of tests shown is simply an example, and any number of tests can be used.

Figure 8B:
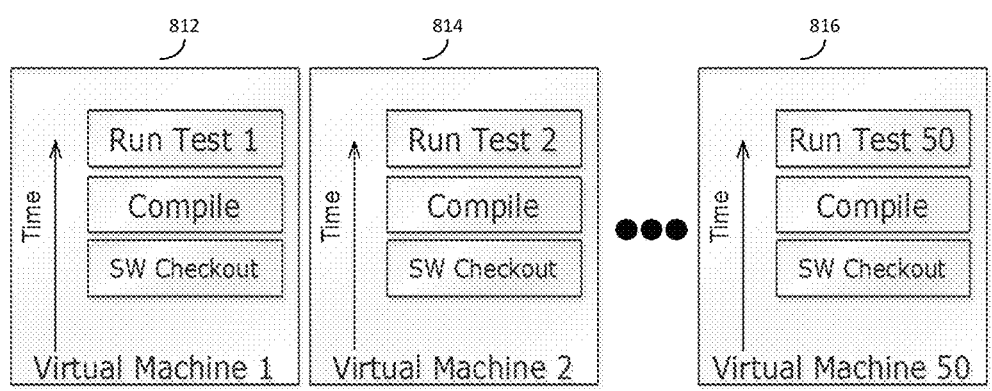

FIG. 8B shows another example, as a step up from this approach, the system then would do each of the steps above on one of 50 independent machines or virtual machines, 812, 814, and 816. The virtual machines, 812, 814, and 816 all execute the common tasks described at the beginning: checking out the source code, compiling it, and then each machine runs a different test at the completion of the compilation phase. Since 50 different VMs run 812, 814, and 816, the run time is now reduced to that of the common compilation plus the time used for the longest of the 50 tests. In some cases, actual time can be slightly worse than that, as the source code checkout phase attempts to checkout the same code to 50 independent VMs 812, 814, and 816 from a common repository. This source repository can frequently be overwhelmed by the traffic requests repeated, from 50 different sources, but each with slightly different timings.

Figure 8C:
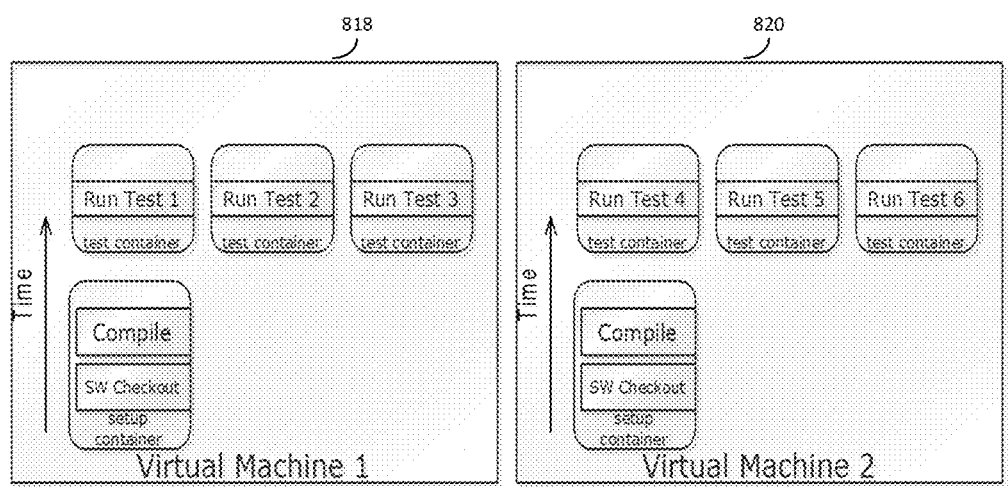

FIG. 8C shows yet another example as an improvement on the above approach, the system can be configured to split out to the lightweight containers, running several to many of these on each VM 818 and 820. The system can be configured to combine optimizations and jump ahead to have each VM 816 and 820 run a setup container which does the common steps such as checkout and/or compilation first, but limit the execution so they occur once per VM. According to some aspects, there are a few rationales for performing such a process. First, the checkout step, as mentioned above, puts great load on the source code repository and network links. Second, the compilation step frequently uses much more memory than that used by individual tests. Doing the common steps once rather than n times (where n is the number of containers on a VM) means the system can fit more containers (a higher n) per VM, using fewer real hardware resources.

Figure 8D:
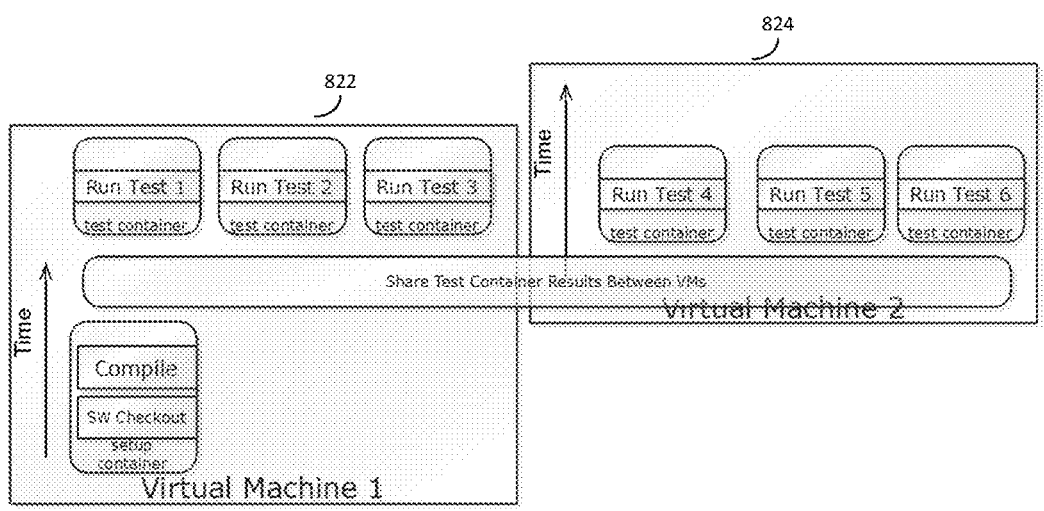

FIG. 8D shows the test containers start with a copy of the filesystem that was the result of running the setup containers. Because of the way layered filesystems work, this is a relatively low-cost way to share within a machine. Next, the system can be configured to run that setup phase once, on the first Virtual Machine 822, and share the result between all of the Virtual Machines 822 and 824. While the illustration provides one additional VM 824 here, each VM could easily be shared with any suitable number of VMs. In some embodiments, the system is configured to not start using additional VM's resources (and begin paying for them) until the system is ready to share the setup container's output.

Figure 9:
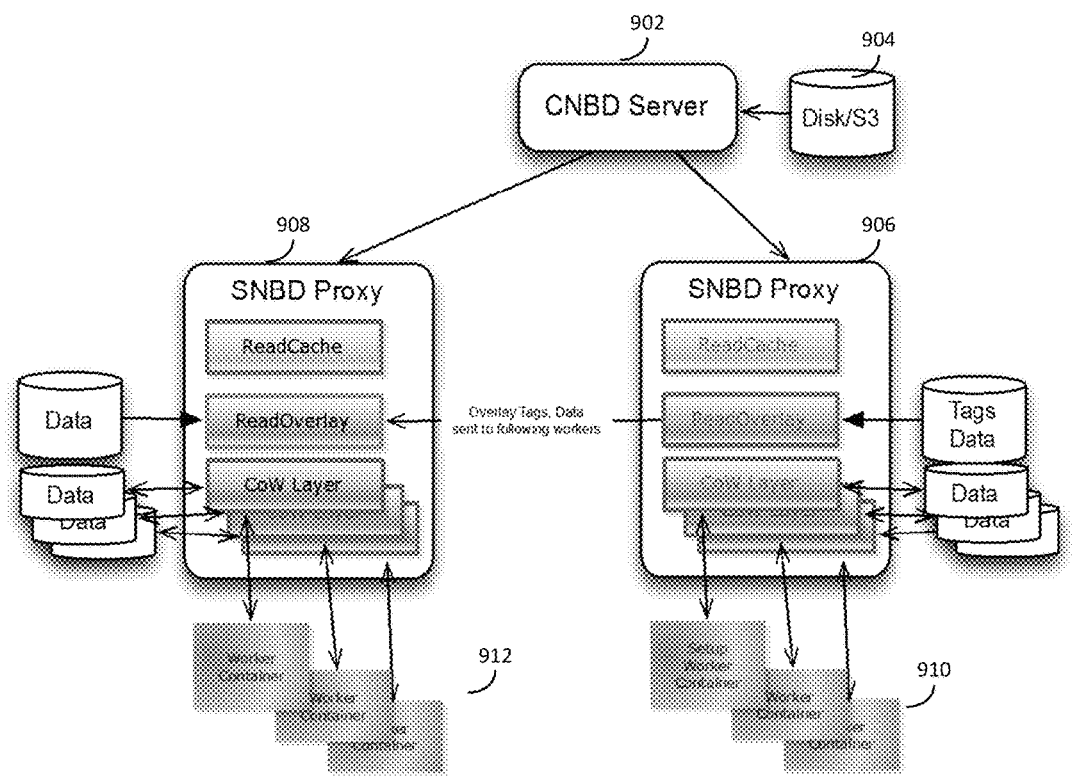
FIG. 9 illustrates an exemplary read overlay sharing system, in accordance with some embodiments.

FIG. 9 illustrates a system using read overlay sharing during setup. According to some aspects, that sharing step can be accomplished in many ways (described above). In some embodiments, the setup results layers can be copied to a central repository 904, copied directly from one worker to another 910 or 912, or pulled on demand by the trailing worker VMs as specific file information is used by the tests. Each approach has advantages and disadvantages for certain cases, and the system is configured to leverage each approach, identify a possible optimal approach, and re-evaluate post execution. In one example, the docker/union filesystem approach would use large block copies of the layers built by the setup container. The "xNBD" or "sNBD" approach discussed herein can be done assuming that each VM actually reads all or most of its filesystem from a network shared block device; all VMs 906 and 908 can read from the original (base, operating system) layer without bulk copies. In one example, those reads are done on demand, and if a given OS resource is never used, the resource never crosses the network. The result of the setup container is a read overlay snapshot, and this overlay is made available to peer VMs 906 and 908 after the setup container has finished, either directly, or by copying up to the common NBD server.

Various embodiments are configured with a "CoW Layer", which refers to a Copy On Write layer, which allows each container 910 and 912 to see an apparently independent filesystem; their writes to the same file are not seen by peer containers. The above diagram uses the VM running a shared NBD proxy 906 to do the setup container process, before making them available to the other following VMs 908.

According to some aspects, the solutions described above tend to generate a significant amount of network traffic both to the "CNBD" server 902 as well as the transfers of the Read Overlay data. According to some embodiments, a Read Cache layer is implemented that greatly reduces that traffic, as each container in a VM 906 or 908 is likely to use at least some common file data. The next optimizations described implements various ways to pre-load those caches, so that while the network traffic is taking place, the latency of a given read demand is reduced to near zero, since the cache hinting, in some optimal cases, may have already been pre-loaded the data. Various implementations of these optimizations are configured to improve the execution of the system over various conventional approaches. Indeed various conventional implementations fail to even consider the kind of workload being optimized in these settings (e.g., including a set of builds and tests which the system has executed (largely) before) and thus cannot execute such functionality. According to some embodiments, the system is configured to use the profiling data captured from earlier runs, and therefore is able to generate much better cache hints than would be normally possible (e.g., based on conventional approaches). Further, the transformation of the profiling data into hints can be executed offline, using whatever resources are available with the expectation that the full build/test run is likely or will be run again in the near future with similar access patterns.

Some embodiments may utilize service discovery. In a service discovery system, when a BX server starts, and periodically after that time, the server can write a small file out to its object store named, for example, BXServer.groupname.servername (The groupname is generally "default" but allows for different sets of servers and clients to work using the same remote store if desired.) The servername is a UUID for the server. The contents of this file can be: last update time, IP address(es) LAN and WAN, service port, and images cached When a BX client starts, as long as the client has the same credentials for the object store the client can see a list of all active servers by listing BXServer.* By convention, in some embodiments, if a client sees a BXServer file that has not been updated in a "long" time, the client will delete it. A "long" time can be several times the server update period.

Some embodiments, may utilize peer to peer client-servers. A client-server can be a client device that also acts as a server. For example, the elements of the BX system can be configured with multiple roles so a BX server can operate as storage unit or data storage for a client or for another BX server, etc. For example, when a client-server process starts up, the client announces itself to object store, as above, but also gets a list of all of its peer servers. The client also starts up a connection to a peer-multicast network protocol (using the addresses announced in object store) such as consul, for example. This can allow small packets to be sent to peers who join the multicast group, and also keeps track of members who are still "live" within the group. When the client's application process connects to an image, the local proxy simply connects to its local server process. But the client also can have live connections available to all other announced servers (and this list may grow or shrink over time).

When the client's application does a read from an image, the request is passed through to its proxy, and if the request is not found in a cache layer (either the CoW layer or RAM read cache layer) the request can be found from a server. First, the server checks to see if the image data is available locally in the local server's disk cache or pool. If so, the data is returned from there. If not, the proxy looks for the Image/SegmentNumber in any of the announcements of the peer servers, which can be found through service discovery. If found, the proxy makes a request of that peer server (an internet connection may or may not have already been established to the server) to get the needed data. If this peer server still has it, the data is returned. If the data is unavailable from any peer server, the local server can download the needed segment from object store, decompress it, and finally return the data to its client. In this case the server can also announce to all of its peers that the server now has the new Image/SegmentNumber pair available on request. If, when downloading the data, the server discovers that it can delete some other data segment to make room, the server can do that and announce to all peer servers that it no longer has the Image/SegmentNumber being deleted, so the peer servers will not waste time asking for it. Finally, servers will generally keep the requested data from their peers, even if the data isn't a full segment size. In some embodiments, requests can be 4 k or 16 k bytes, for example. If, over time, the server detects that it has accumulated a full contiguous Segment of image data from its peer(s), the server can combine them into a segment .data.N file and announce to its peers that the server, too, has this segment to offer, lowering the load on other peer servers that had been serving that segment. It should be appreciated that these embodiments differ from traditional peer-to-peer file sharing in that the BX system shares blocks within disk images and, the client implements a CoW layer, making the system appear read-write while traditional systems may share individual files.

According to an aspect of the present disclosure, use of access stream to generate cache hints controlling server cache and client caches is distributing the work of a large file server or disk server between remote (immutable) and local (CoW) nodes.

According to another aspect, use of hint stream to pre-load caches is likely to be even more applicable if done at a file server level rather than a disk block server level of abstraction. File caching can be shared at the lowest level between client containers, and the higher level of abstractions is much less noisy as the system changes. For example, a hint stream at a file server level can be related to "get blocks of file "foo.class"" while a disk block server level can be related to "get blocks 17-22". In some cases, file caching can be easier shared at the lowest level when a remote server's image is generally immutable. According to yet another aspect, use of hint stream to pre-load caches can also be applicable at a distributed database level.

According to yet another aspect, peer-to-peer servers as proposed for the overlay layers shared between workers can also extend to enhancing S3-like object store access, either as cluster-local cache or for transient objects during a job, possibly using s3-like api.

According to another aspect, batch hint generation using trivial cache simulations or more abstract machine learning results in triggers that may execute on either a client or the server. An example of a server hint is "just asked for block 78, but pattern always want blocks 79-100 as well. Send block 78 immediately followed by 79-100 (or 78-100 in one response)." The patterns can be more subtle in some examples. As an example, accessing A, B, C, B means something significant worth pre-loading, while A, B, C, anything else does not. According to some aspects, a computation problem is that the second access of B will be consumed by the client's cache. In some embodiments, the system configures the hints with a state machine that runs on the client. For example, the state machines are constructed with minimal complexity and to executed quickly, but can then (upon detecting A, B, C, B) send the message to the server as the state machine return the data for the second B request. In some embodiments, the state machines are configured to handle some noise, however, as a different thread can get in after A, B, C, which doesn't mean the second B won't come. The system simply has not executed the second B request yet. In further embodiments, the state machine is configured to continue to look for the second B. In some examples, for a set threshold of operations or set threshold of time.

Various aspects and functions described herein can be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants), network equipment (e.g., load balancers, routers, and switches), and cloud based compute resources. Further, aspects can be located on a single computer system or can be distributed among a plurality of computer systems connected to one or more communications networks.

The above-described embodiments can be implemented in any of numerous ways. For example, the embodiments can be implemented using hardware, software or a combination thereof. When implemented in software, the software code can be executed on a processor or collection of processors, whether provided in a single computer or distributed among multiple computers. Such processors can be implemented as integrated circuits, with one or more processors in an integrated circuit component, including commercially available integrated circuit components known in the art by names such as CPU chips, GPU chips, microprocessor, microcontroller, or co-processor. Alternatively, a processor can be implemented in custom circuitry, such as an ASIC, or semicustom circuitry resulting from configuring a programmable logic device. As yet a further alternative, a processor can be a portion of a larger circuit or semiconductor device, whether commercially available, semi-custom or custom. As a specific example, some commercially available microprocessors have multiple cores such that one or a subset of those cores may constitute a processor. Though, a processor can be implemented using circuitry in any suitable format.

Further, it should be appreciated that a computer can be embodied in any of a number of forms, such as a rack-mounted computer, a desktop computer, a laptop computer, or a tablet computer. Additionally, a computer can be embedded in a device not generally regarded as a computer but with suitable processing capabilities, including a Personal Digital Assistant (PDA), a smart phone or any other suitable portable or fixed electronic device.

Depending on the nature of the computing device, one or more additional elements can be present. For example, a smart phone or other portable electronic device may include a camera, capable of capturing still or video images. In some embodiments, a computing device may include sensors such as a global positioning system (GPS) to sense location and inertial sensors such as a compass, an inclinometer and/o ran accelerometer. The operating system may include utilities to control these devices to capture data from them and make the data available to applications executing on the computing device.

As another example, in some embodiments, a computing device may include a network interface to implement a personal area network. Such an interface may operate in accordance with any suitable technology, including a Bluetooth, Zigbee or an 802.11 ad hoc mode, for example.

Such a computer device can be interconnected by one or more networks in any suitable form, including as a local area network or a wide area network, such as an enterprise network or the Internet. Such networks can be based on any suitable technology and may operate according to any suitable protocol and may include wireless networks, wired networks or fiber optic networks.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices can be physically integrated into the same unit as the processor or other elements of the computing device. For example, a keyboard can be implemented as a soft keyboard on a touch screen. Alternatively, the input/output devices can be entirely disconnected from the computing device, and functionally integrated through a wireless connection.

Figure 10:
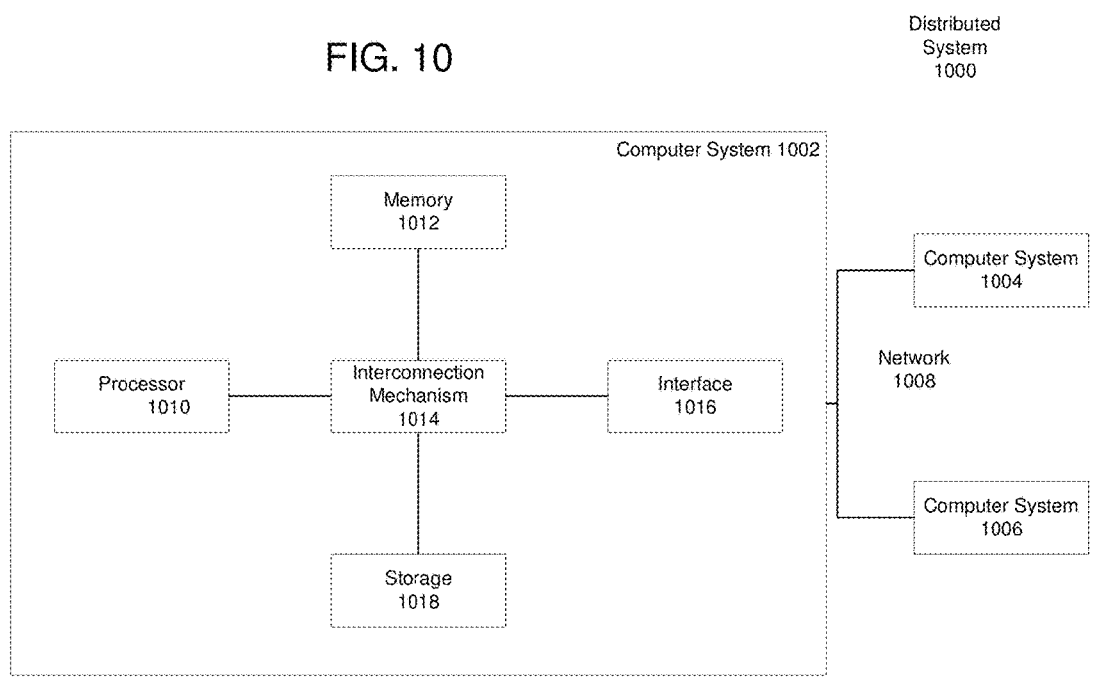
FIG. 10 is a block diagram of a computer system that can be specially configured to execute the functions described herein.

For example, various aspects, functions, and processes may be distributed among one or more computer systems configured to provide a service to one or more client computers, or to perform an overall task as part of a distributed system, such as the distributed computer system 1000 shown in FIG. 10. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 10, there is illustrated a block diagram of a distributed computer system 1000, in which various aspects and functions are practiced. As shown, the distributed computer system 1000 includes one or more computer systems that exchange information. More specifically, the distributed computer system 1000 includes computer systems 1002, 1004, and 1006. As shown, the computer systems 1002, 1004, and 1006 are interconnected by, and may exchange data through, a communication network 1008. The network 1008 may include any communication network through which computer systems may exchange data. To exchange data using the network 1008, the computer systems 1002, 1004, and 1006 and the network 1008 may use various methods, protocols and standards. To ensure data transfer is secure, the computer systems 1002, 1004, and 1006 may transmit data via the network 1008 using a variety of security measures including, for example, SSL or VPN technologies. While the distributed computer system 1000 illustrates three networked computer systems, the distributed computer system 1000 is not so limited and may include any number of computer systems and computing devices, networked using any medium and communication protocol.

As illustrated in FIG. 10, the computer system 1002 includes a processor 1010, a memory 1012, an interconnection element 1014, an interface 1016 and data storage element 1018. To implement at least some of the aspects, functions, and processes disclosed herein, the processor 1010 performs a series of instructions that result in manipulated data. The processor 1010 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1010 is connected to other system components, including one or more memory devices 1012, by the interconnection element 1014.

The memory 1012 stores programs (e.g., sequences of instructions coded to be executable by the processor 1010) and data during operation of the computer system 1002. Thus, the memory 1012 may be a relatively high performance, volatile, random access memory such as a dynamic random access memory ("DRAM") or static memory ("SRAM"). However, the memory 1012 may include any device for storing data, such as a disk drive or other nonvolatile storage device. Various examples may organize the memory 1012 into particularized and, in some cases, unique structures to perform the functions disclosed herein. These data structures may be sized and organized to store values for particular data and types of data.

Components of the computer system 1002 are coupled by an interconnection element such as the interconnection element 1014. The interconnection element 1014 may include any communication coupling between system components such as one or more physical busses in conformance with specialized or standard computing bus technologies. The interconnection element 1014 enables communications, including instructions and data, to be exchanged between system components of the computer system 1002.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1002 to exchange information and to communicate with external entities, such as users and other systems.

The data storage element 1018 includes a computer readable and writeable nonvolatile, or non-transitory, data storage medium in which instructions are stored that define a program or other object that is executed by the processor 1010. The data storage element 1018 also may include information that is recorded, on or in, the medium, and that is processed by the processor 1010 during execution of the program. More specifically, the information may be stored in one or more data structures specifically configured to conserve storage space or increase data exchange performance. The instructions may be persistently stored as encoded signals, and the instructions may cause the processor 1010 to perform any of the functions described herein. The medium may, for example, be optical disk, magnetic disk or flash memory, among others. In operation, the processor 1010 or some other controller causes data to be read from the nonvolatile recording medium into another memory, such as the memory 1012, that allows for faster access to the information by the processor 1010 than does the storage medium included in the data storage element 1018. The memory may be located in the data storage element 1018 or in the memory 1012, however, the processor 1010 manipulates the data within the memory, and then copies the data to the storage medium associated with the data storage element 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more computers having a different architectures or components than that shown in FIG. 10. For instance, the computer system 1002 may include specially programmed, special-purpose hardware, such as an application-specific integrated circuit ("ASIC") tailored to perform a particular operation disclosed herein. While another example may perform the same function using a grid of several general-purpose computing devices and several specialized computing devices running proprietary hardware and operating systems.

The computer system 1002 may be a computer system including an operating system that manages at least a portion of the hardware elements included in the computer system 1002. In some examples, a processor or controller, such as the processor 1010, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 1010 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In this respect, various embodiments can be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects as discussed above. As used herein, the term "computer-readable storage medium" encompasses only a computer-readable medium that can be considered to be a manufacture (i.e., article of manufacture) or a machine. Alternatively or additionally, various embodiments can be embodied as a computer readable medium other than a computer-readable storage medium, such as a propagating signal.

In some examples, the components disclosed herein may read parameters that affect the functions performed by the components. These parameters can be physically stored in any form of suitable memory including volatile memory (such as RAM) or nonvolatile memory (such as a magnetic hard drive). In addition, the parameters can be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

The terms "code", "program" or "software" are used herein to refer to any type of computer code or set of computer-executable instructions that can be employed to program a computer or other processor to implement various aspects as discussed above. Additionally, it should be appreciated that according to one aspect of this embodiment, one or more computer programs that when executed perform methods discussed herein need not reside on a single computer or processor, but can be distributed in a modular fashion amongst a number of different computers or processors to implement various aspects.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments. The instructions can be persistently stored as encoded signals, and the instructions may cause the processor to perform any of the functions described herein.

Also, data structures can be stored in computer-readable media in any suitable form. For simplicity of illustration, data structures can be shown to have fields that are related through location in the data structure. Such relationships may likewise be achieved by assigning storage for the fields with locations in a computer-readable medium that conveys relationship between the fields. However, any suitable mechanism can be used to establish a relationship between information in fields of a data structure, including through the use of pointers, tags or other mechanisms that establish relationship between data elements. The media may, for example, be optical disk, magnetic disk or flash memory, among others. In operation, the processor manipulates the data within the memory, and then copies the data to the storage medium associated with the data storage element after processing is completed. A variety of components may manage data movement between the storage medium and other memory elements and examples are not limited to particular data management components. Further, examples are not limited to a particular memory system or data storage system.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Further, though advantages of the present disclosure are indicated, it should be appreciated that not every embodiment will include every described advantage. Some embodiments may not implement any features described as advantageous herein and in some instances. Accordingly, the foregoing description and drawings are by way of example only.

Various aspects can be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment can be combined in any manner with aspects described in other embodiments.

Also, various embodiments can be embodied as a method, of which an example has been provided. The acts performed as part of the method can be ordered in any suitable way. Accordingly, embodiments can be constructed in which acts are performed in an order different than illustrated, which may include performing some acts simultaneously, even though shown as sequential acts in illustrative embodiments. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A distributed data storage system comprising:
an electronic memory storage unit that electronically stores common data;
a first electronic server including a first processor, wherein the first processor is configured to retrieve the common data from the electronic memory storage unit;
a second electronic server;
an electronic client device comprising: a computer application that is an executable program, a file system that stores data utilized by the computer application, the file system being accessed by the application, and a proxy unit;
wherein the proxy unit allows the electronic client device to access the common data in the electronic storage unit through the first server, the proxy unit having a layered architecture including a copy-on-write layer, a read cache, and a read overlay;
wherein the proxy unit executes remote requests received from the application on the common data and data in the copy-on-write layer;
wherein the application modifies the data in the file system;
wherein after the application has modified data in the file system, the modifications are stored in the copy-on-write layer and the application disconnects from the proxy unit;
wherein after the application disconnects from the proxy unit, the copy-on-write layer is saved in the read-overlay;
wherein the read-overlay including the modifications is uploaded to the first server and the second server to be made available to any other proxy unit in any other client device;
and
wherein the electronic storage unit is located external to the electronic client device.

2. The system of claim 1, wherein the proxy unit includes at least an executable component configured to execute on a client device.

3. The system of claim 1, wherein the proxy unit is further configured to manage a local cache for pre-fetching data responsive to cache hints.

4. The system of claim 3, wherein the proxy unit is configured to retrieve and store data from the first server or the storage unit in the local cache responsive to data access patterns for respective client devices.

5. The system of claim 4, wherein the proxy unit is configured to load the data read from the first server or the storage unit into the cache based on at least one predicted request.

6. The system of claim 1, wherein the first server is configured to:
manage a data architecture including at least a portion of common data and a copy on write layer; and
store any data written by the client within the copy on write layer and associated with a respective client.

7. The system of claim 6, wherein the second server is configured to access the copy on write layer of the first server.

8. The system of claim 1, wherein the proxy unit is configured to:
interact with the copy on write layer; and
request data from the copy on write layer for respective clients.

9. The system of claim 8, wherein at least one of the first server and the second server is configured to access the copy on write layer of the proxy unit.

10. The system of claim 1, wherein the proxy unit is configured to:
host at least a portion of data managed in a copy on write layer; and
store any data written by a respective client associated with at least the portion within the copy on write layer.

11. The system of claim 1, wherein the common data is configured to be available only in read-only form and the first server is configured to access the storage unit without checking a status of the common data.

12. The system of claim 1, wherein the storage unit comprises at least one of: hard disk, a cloud based storage service, a storage array, or a server instance.

13. The system of claim 1, wherein the elements of the system are configured to execute multiple roles, wherein a server can operate as a proxy unit or storage unit for different elements of the system.

14. A computer implemented method for managing a distributed data storage comprising:
obtaining, by a first processor on a first electronic server, a remote request from a client device, the remote request requesting access to common data stored on an electronic memory storage unit;
providing a second electronic server;
providing an electronic client device comprising: a computer application that is an executable program, a file system that stores data utilized by the computer application, the file system being accessed by the application, and a proxy unit;
wherein the proxy unit allows the electronic client device to access the common data in the electronic storage unit through the first server, the proxy unit having a layered architecture including a copy-on-write layer, a read cache, and a read overlay;
wherein the proxy unit executes remote requests received from the application on the common data and data in the copy-on-write layer;
wherein the application modifies the data in the file system;
wherein after the application has modified data in the file system, the modifications are stored in the copy-on-write layer and the application disconnects from the proxy unit;
wherein after the application disconnects from the proxy unit, the copy-on-write layer is saved in the read-overlay;
wherein the read-overlay including the modifications is uploaded to the first server and the second server to be made available to any other proxy unit in any other client device; and wherein the electronic storage unit is located external to the electronic client device.

15. The method of claim 14, further comprising authenticating the client device through a server.

16. The method of claim 14, wherein the storage unit is located external to the client device method further comprises executing an executable component on the proxy device.

17. The method of claim 14, wherein the copy-on-write layer is configured to store any data written to the storage unit by the client device.

18. The method of claim 14, further comprising:
managing a data architecture including at least a portion of common data and the copy-on-write layer; and
storing any data written by the client within the copy write layer and associated with a respective client.

19. The method of claim 14, wherein the first server is configured to access the copy-on-write layer of the proxy unit.

20. The method of claim 14, wherein the common data is configured to be available only in read-only form and the first server is configured to access the storage unit without checking a status of the common data.

21. The method of claim 14, further comprising storing, on a cache of the proxy unit, prefetching data from the storage unit in response to a cache hint.

22. The method of claim 21, further comprising:
hosting at least a portion of data managed in a copy on write layer; and
storing any data written by a respective client associated with at least the portion within the copy on write layer.

23. The method of claim 22, further comprising accessing a predicted request and accessing at least a portion of the common data based on the predicted request.

* * * * *